United States Patent

[11] 3,558,823

[72] Inventors Martin B. Brilliant
Holmdel;
Frits Elenbaas, Fairhaven, N.J.

[21] Appl. No. 741,579
[22] Filed July 1, 1968
[45] Patented Jan. 26, 1971

[73] Assignee Bell Telephone Laboratories, Incorporated
Murray Hill, Berkeley Heights, N.J.
a corporation of New York

[54] TANDEM OFFICE SWITCHING SYSTEM
14 Claims, 13 Drawing Figs.

[52] U.S. Cl. .................... 179/15
[51] Int. Cl. .................... H04j 3/00
[50] Field of Search .................... 179/15ATC, 15ASYNC, 15AT, 15APC

[56] References Cited

UNITED STATES PATENTS

| | | | |
|---|---|---|---|
| 2,958,039 | 10/1960 | Anderson | 324/77 |
| 3,042,751 | 7/1962 | Graham | 179/15 |
| 3,327,062 | 6/1967 | Klund et al. | 179/15 |

*Primary Examiner*—Kathleen H. Claffy
*Assistant Examiner*—David L. Stewart
*Attorneys*—R. J. Guenther and James Warren Falk

ABSTRACT: A telephone tandem office switching system accommodating information received in multiplexed digital form is disclosed. A combination time and space division network employing two signal transmission rates, distinct from the rate employed on the interoffice trunks, transfers the information through the tandem office. Also the number of digits per time division multiplex channel is varied during transit to facilitate internal control functions.

Figure 1:
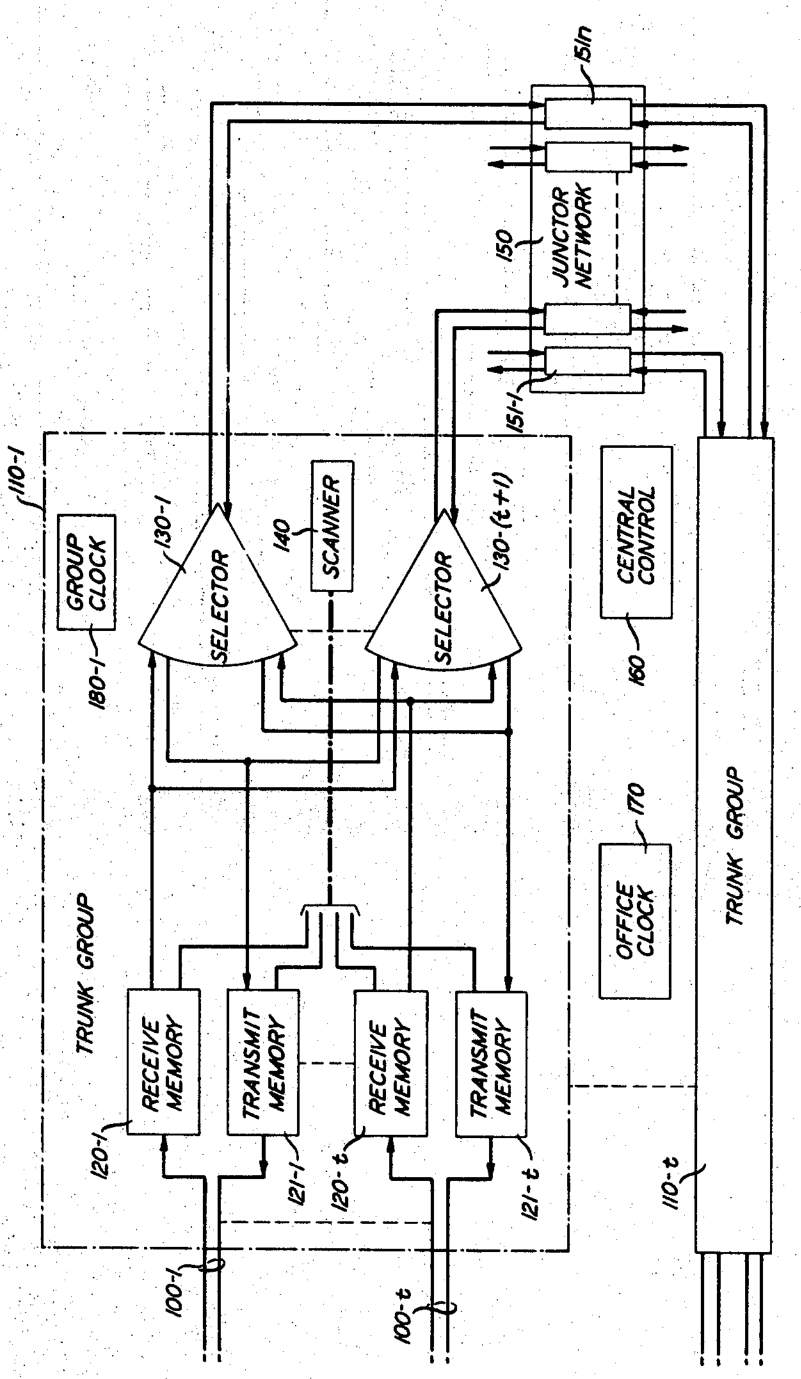

INVENTORS M.B. BRILLIANT
F. ELENBAAS

BY R.C. Winter
ATTORNEY

JUNCTOR

TRANSMIT MEMORY 121-1

TRUNK SCANNER 140

TANDEM OFFICE SWITCHING SYSTEM

BACKGROUND OF THE INVENTION

In densely settled communities, where the number of local central offices is large and the amount of interoffice traffic is high, it is often uneconomical to provide trunks between each pair of offices. In such cases tandem switching centers are used to interconnect the local offices, calls between offices being completed through the tandem center rather than through interoffice trunks directly linking the offices. Thus the function of a tandem center with respect to the local central office which it serves corresponds to some extent to the operation of a local central office in interconnecting subscriber lines which terminate in the office; i.e., the tandem center establishes paths between central offices and the central office establishes paths between local subscribers.

The current practice in telephone tandem offices is to establish a solid connection between a calling and a called trunk via a path which is associated individually and uninterruptedly with the connection for the duration of the call. Thus a quantity of equipment, dependent upon the number of trunks served and the expected frequency of service, is provided in a common pool from which portions may be chosen and assigned for a particular call. Such a system arrangement is referred to as "space division" in which privacy of conversation is assured by the separation of individual conversations in space.

Tandem switching on a space division basis presents certain problems when transmission of information in multiplexed digital form is contemplated. Digital transmission, of course, is the current trend as evidenced, for example, by the use of pulse code modulation (PCM) for short haul traffic and by the burgeoning data processing business with its incident transfer between computer centers of data in coded form. In order to handle voice traffic in digital form, the conventional tandem center is required to convert the incoming PCM signals to analogue form for processing by the space division switching network. Then, of course, the data may require reconversion to digital form for transmission to a distant local office. Such conversion and reconversion is a costly process and also adds undesirable quantizing noise to the signal being transmitted.

The introduction of a time division switching network into the tandem center to process information through the center in digital form would substantially reduce the economic burden on the system and improve transmission. In time division systems, a number of conversations share a single path. Privacy of conversations is assured in such systems by separation of samples of individual conversations in time. Thus each call is assigned to the common path or highway for an extremely short but rapidly and periodically recurring interval, and the connection between any two stations in communication is completed only during these short intervals. Samples which retain essential characteristics of the voice or other signal are transmitted in these intervals or time channels. These samples then are utilized to reconstruct the original signal so that the reception of signals of any complexity through the time division network is satisfactory.

For purposes of short haul traffic, such voice signals typically are coded in PCM form, and the binary digits forming a coded word are transmitted in each time channel. Thus, at the tandem office, intelligence and supervisory information is received in time division multiplexed digital form. It is the task of the tandem office to detect and distinguish between these various signals and switch them to appropriate trunks.

The switching of digital signals through a tandem office on a time division multiplex basis presents a number of problems including synchronization and blocking. Synchronization requirements of operational timing increase in severity in proportion to the number of independently controlled offices involved in a call connection, the duration of the call and the distances between offices. Without synchronization, transmission delays of varying amounts, unless compensated, will result in erroneous data transmission. A number of methods for obviating such errors have been suggested in the prior art, but they are often too complex, inflexible and expensive to satisfy commercial requirements.

Blocking at the tandem office can occur, for example, when the time channel assigned to a calling station controlled by one central office is found to be occupied on another call in the central office controlling the called station or in the tandem center interconnecting the two central offices. This blocking problem may be reduced by interchanging the transmitted information among different time channels assigned to the calling and called stations when blocking is encountered in the initially assigned time channel. An arrangement for effecting such time channel interchange is disclosed for example, in H. Inose et al. U.S. Pat. No. 3,172,956 issued March 9, 1965. Nevertheless, some blocking can be expected and, of course, in a telephone system the loss of any calls due to the inability of the physical plant to accommodate them under traffic conditions for which the system was designed undesirable.

Another factor which must be taken into account in digital transmission through time division switching systems is that time channels are at a premium. Also a certain amount of supervisory information must share the time channels with the intelligence signals in order to establish, monitor and takedown connections. Furthermore, additional equipment is required in each office to store and control the transfer of supervisory data across the corresponding office, again adding to the expense of this type of operation.

SUMMARY OF THE INVENTION

A tandem office which solves these prior art problems receives and transmits digital information on respective receive and transmit paths of time division multiplex highways, referred to hereinafter as trunks. These trunks, each accommodating $s$ time channels, are organized in modules, referred to hereinafter as trunk groups of $t$ trunks each, the tandem office comprising a total of $t$ trunks groups. Each trunk group in turn, has access to every other trunk group and to itself via time division connecting links termed junctors, each junctor containing $t$ time channels. Selectors are provided in each trunk group to connect the junctors selectively to the corresponding trunks.

This switching arrangement, which combines space and time division access, thus provides for cross-office expansion of $s$-to-$t$ channels. Any channel in any junctor can be linked with any channel in any trunk terminating on the tandem office. The result is a simple network capable of serving a large number of trunks, each of the $t$ trunk groups with its selectors being the equivalent of a single stage $st \times t^2$ switch. Each pair of trunks is joined by a distinct physical path through the network, blocking being alleviated by the increased number of available cross-office channels.

According to one aspect of the invention, three distinct repetitive cycles or frames, each subdivided into a plurality of information bearing segments or time channels, are employed in the tandem office. Digital information is transferred over the trunks at a first rate, across the office via the junctors at a second rate and within the trunk group at a third rate. The exact transmission rates depend upon the number of binary digits or bits to be transmitted over the trunks in each trunk frame $F_1$. The cross-office frame $F_2$ is equal in duration to the trunk frame $F_1$ but has more channels with a greater bit capacity per channel and thus operates at a higher frequency. The third rate, utilized in the trunk group, established an intermediate frame $F_3$ equal in duration to a single channel in the cross-office frame $F_2$. This intermediate frame $F_3$ also has a greater bit capacity per channel than $F_2$ and thus operates at a considerably higher frequency than is present in $F_1$ of $F_2$. In summary then, a bit stream received in the tandem office at one rate in repetitive trunk frame $F_1$ is circulated within the trunk group in intermediate frame $F_3$ the third rate, higher than the first rate, and then is selectively transmitted across the office in cross-office frame $F_2$ at the second in between the first and third rates. The process is then reversed for transmission of this digital information from the tandem office.

The bits received from the trunk channels include intelligence and signaling information. The signaling information, including requests for service, dial pulsing and disconnects, need not be transmitted with the same frequency as intelligence information. Thus in this instance as in prior art systems of this type, signaling information is transmitted only once in each *f* frames. Furthermore, signaling information occupies only one out of *m* bit positions in each trunk channel during the signaling frame, the balance being occupied by intelligence bits. In frames other than signaling frames, of course, all *m* bit positions in each channel are occupied by intelligence bits. In accordance with another aspect of our invention, the need for additional storage and control equipment in the tandem office to transfer the infrequent signaling information across the office is obviated by allocating an ($m$+1 th bit position in each frame, an operation which does not require additional control equipment. Having crossed the office, the signaling bit is returned to the *m*th bit position of a signaling for frame transmission from the tandem office.

According to another aspect of the invention, the fact that the number of cross-office channels *t* is greater than the number of trunk channels *s* permits the bits in each trunk channel, upon receipt in the trunk terminal equipment at the interoffice transmission rate, to be interleaved in frame $F_3$ with bits received in other trunk channels and with auxiliary bits added by the tandem office for a variety of purposes such as maintenance and path tracing. All of the bits are then circulated at a higher rate in the trunk group. Subsequently, the auxiliary bits are removed and the intelligence bits assembled and transmitted at a reduced rate through the junctors in one cross-office channel of frame $F_2$. Again, at the transmit side of the network, the auxiliary bits may be added and removed and the intelligence bits in a particular trunk channel transmitted over the assigned trunk.

It may be noted that the auxiliary bits which perform tandem office functions vital to the overall system operation, but which need not be transmitted cross-office, are inserted and removed in the trunk group circulating the information at the highest frequency. Since such auxiliary bits are not transmitted cross-office, the space otherwise occupied by such auxiliary bits may be utilized, in accordance with another aspect of the invention to displace in phase the intelligence bits actually transmitted cross-office. Such displacement in turn compensates for the delay actually encountered during cross-office transmission.

DRAWING

Figure 8:
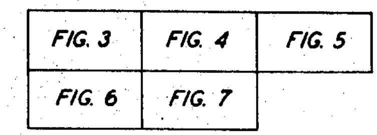
Figure 6:
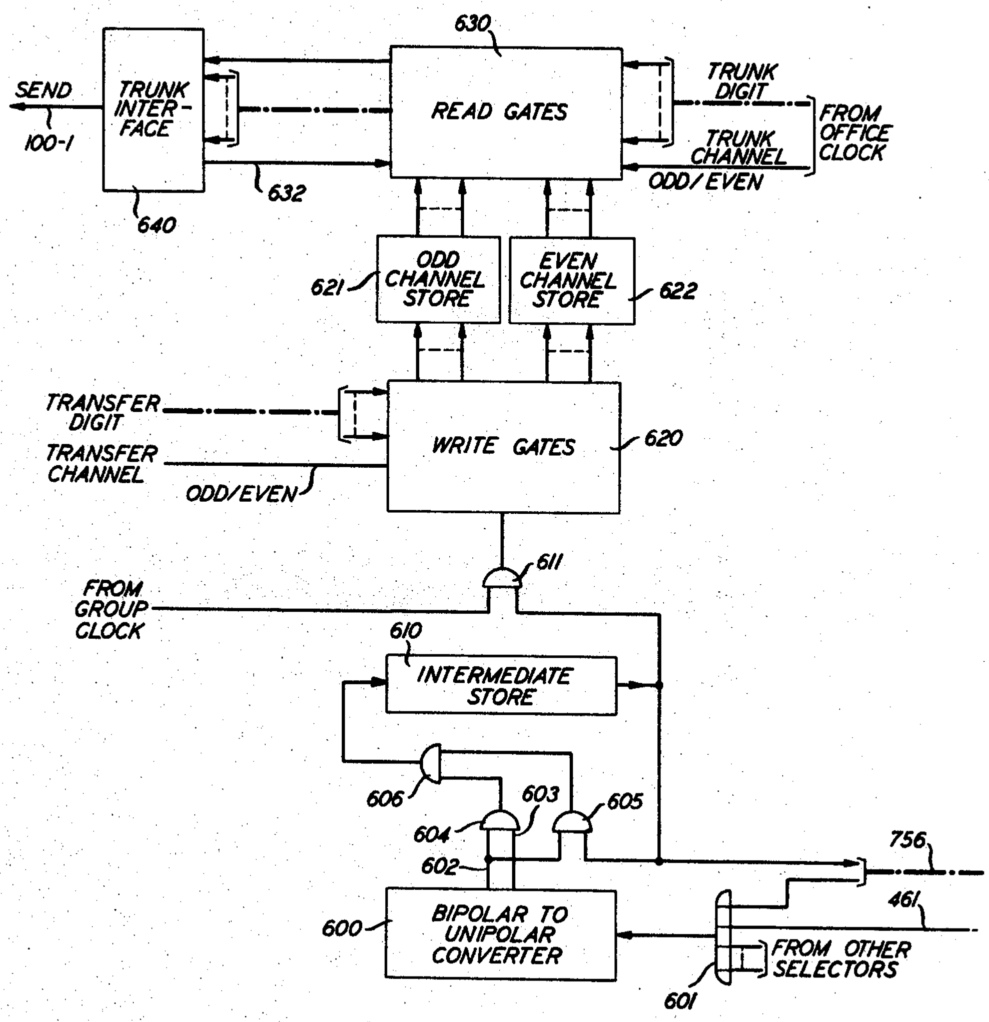
Figure 9:
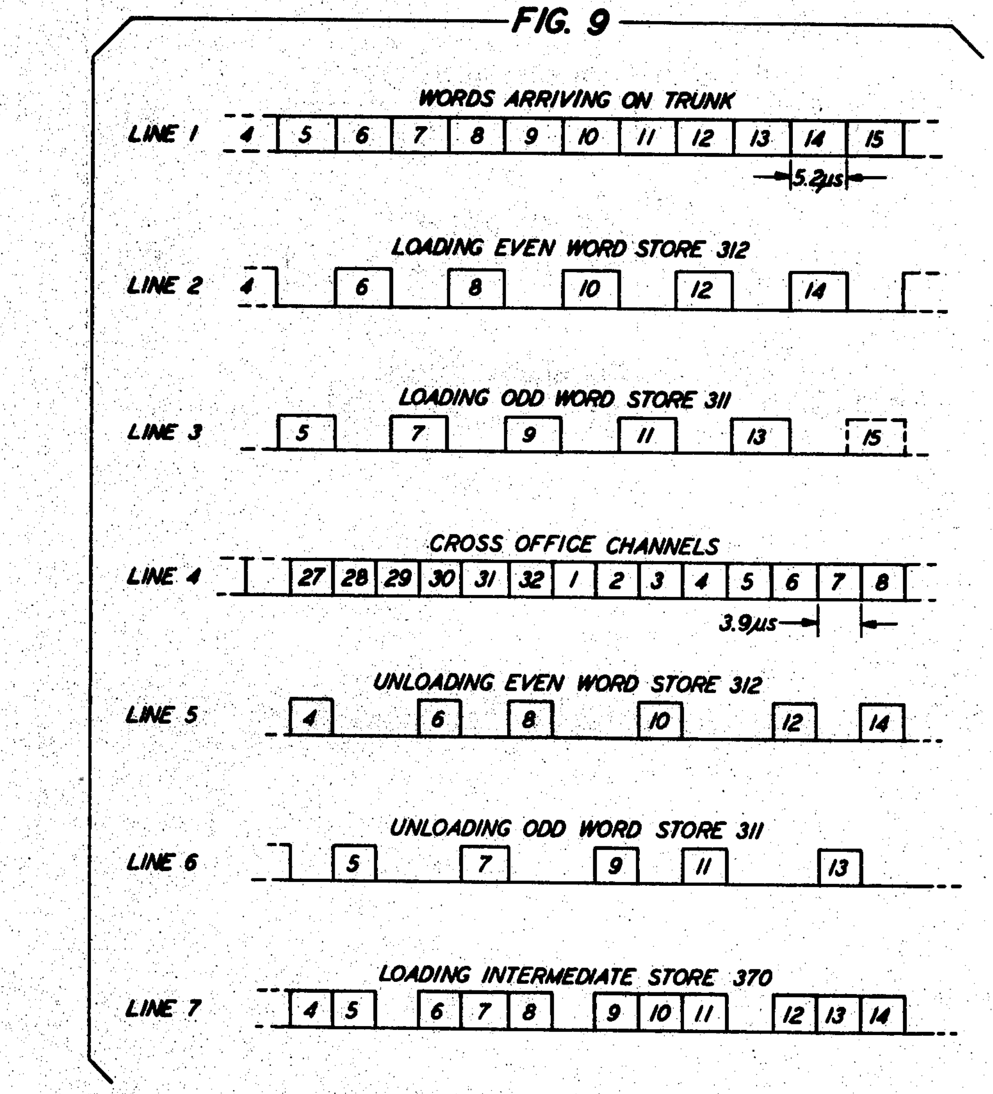

FIG. 1 is a block diagram representation of a telephone tandem office including a combination time and space division switching network illustrative of one specific embodiment of our invention;

FIGS. 2A—2E depict various repetitive time cycles or frames utilized in the office of FIG. 1;

FIGS. 3—7, when arranged as indicated in FIG. 8, provide a more detailed representation partially in schematic form of the telephone tandem office of FIG. 1; and FIG. 9 is a timing chart depicting the transfer of information occurring in the trunk terminal equipment of the tandem office of FIG. 1.

GENERAL DESCRIPTION (FIG. 1)

Turning now to the drawing, the telephone tandem office depicted in FIG. 1 includes trunks 100–1 through **100–*t*, each of which consists of distinct incoming and outgoing paths for transmission in opposite directions. These trunks carry information obtained from a number of sources, coded in binary digit or bit form and combined through time division multiplexing into a continuous bit stream for transmission in a repetitive series of time intervals or channels through the transmission medium. The conventional practice in tandem offices is to convert such digital information into analogue form for transmission through a space division network. This, of course, requires that the digital information received on trunks 100–1 through 100–*t*** *be converted* be converted to analogue form prior to switching.

The arrangement in accordance with this illustrative embodiment of the invention permits signals to be switched through the tandem office in digital form. The saving in conversion equipment realized by employing this approach may be substantial, and moreover, quantizing noise developed upon each such conversion is eliminated. The trunk terminating equipment in each of the trunk groups 110–1 through **110–*t* comprises a receive memory and a transmit memory for each trunk. Thus as indicated for trunk group 110–1, trunk 100–1 terminates on receive and transmit memories 120–1 and 121–1**, respectively.

Each trunk group also includes a group of selectors 130–1 through **130–(*t*+1), each selector having access to all of the receive memories 120–1 through 120–*t* and transmit memories 121–1 through 121–*t* in order to complete paths through the network involving any trunk in this group. A trunk scanner is contained in each trunk group, such as scanner 140 in trunk group 110–1, and serves to detect changes in the supervisory state of any particular channel in the trunks terminating on the corresponding trunk group. Junctor switching network 150 provides the connecting link between selectors in the corresponding trunk groups and includes junctors 151–1 through 151–*n***, where $n = t + \frac{t(t-1)}{2}$. Thus each trunk group has access through its $t$+1 selectors to $t$ junctors, including one intragroup junctor.

Clock 170 includes circuitry well known in the art for generating timing signals used to define the various frequencies required throughout the tandem office to satisfy general office control functions. Also a group clock, such as clock 180–1 in trunk group 110–1, is provided in each trunk group 110–1 through **110–*t* to time particular operations in the corresponding group under control of office clock 170**. The network arrangement in accordance with this embodiment of the invention permits this flexibility in operational timing.

Central control 160 advantageously may comprise a signal processor which includes a stored program for determining actions to be taken in the network. Appropriate commands are issued in response to information received in central control 160 and such commands are directed to all network components in the tandem office for execution. Stored program control arrangements suitable for this purpose are well known in the art, as evidenced for example in Bell System Technical Journal, Vol. 43, Sept., 1964, pp. 2483—2533.

For purposes of this disclosure a specific number of operating elements and specific time cycles and frequencies will be assigned to illustrate the network operation. Thus each trunk group in this example terminates 32 trunks, and each trunk, in turn, carries intelligence in 24 multiplexed trunk channels, i.e., $s = 24$ and $t = 32$. A fully equipped network, in this example, is composed of 32 trunk groups, each group terminating 32 trunks for a total of 1024 trunks and 24,576 trunk channels. Each trunk group, in turn, contains 32 receive memories and 32 transmit memories, and accesses 32 junctors in junctor network 150 including one intragroup junctor. Each trunk group also contains 33 selectors and one trunk scanner. The overall network comprises 528 junctors arranged for time division, each accommodating 32 cross-office channels.

Thus the network in this specific example provides time division expansion from 24 trunk channels to 32 cross-office channels. Any cross-office channel through any junctor can be linked by a selector to any trunk channel on any trunk terminating on the network. The combination of space and time division access makes each trunk group with its selectors the equivalent of a one stage 768 × 1024 switch between the trunks and the junctors.

TIMING (FIGURES 2A—2E)

Figure 2A:
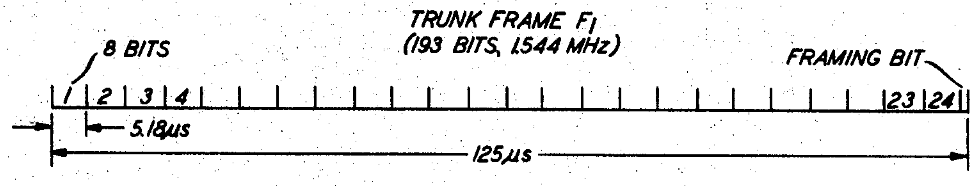

Continuing with the specific examples to illustrate this embodiment of our invention, the trunk frame $F_1$, as depicted in FIG. 2A, is composed of 24 trunk channels of eight bits each plus one framing bit for a total of 193 serially transmitted bits. Assuming a trunk transmission rate of 1.544 MHz., the duration of each trunk frame $F_1$, as indicated in FIG. 2A, is 125 microseconds, and of each 8-bit trunk channel is 5.18 microseconds.

This trunk frame rate established the internal frame rates for the tandem office. Thus the cross-office frame $F_2$, FIG. 2B, comprises 32 channels of 11 bits each for a total of 352 bits. Since the frame duration of 125 microseconds coincides with the trunk frame duration, the frequency of cross-office transmission is increased to 2.816 MHz. in order to accommodate the increased number of transmitted bits. In this instance each channel has a duration of 3.91 microseconds.

Figure 2B:
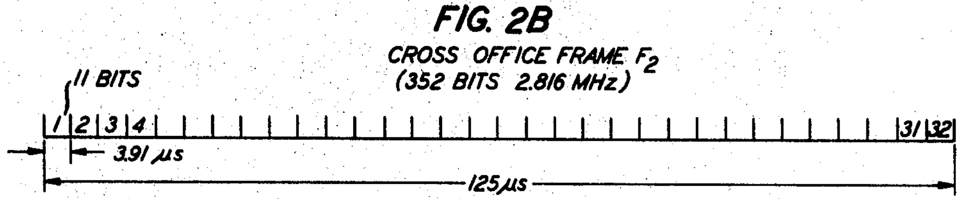
Figure 2C:
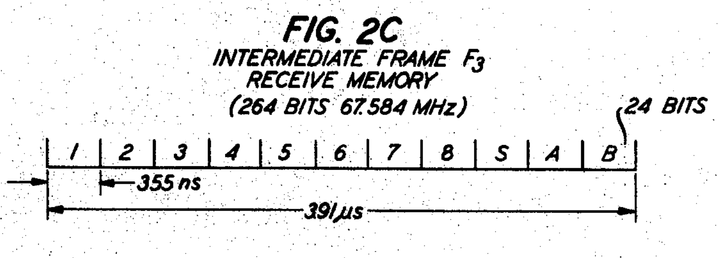

An intermediate frame rate is utilized in the receive and transmit memories to provide an interface between the trunk and cross-office frame rates. This intermediate frame $F_3$ is illustrated in FIGS. 2C and 2E. The duration of frame $F_3$ is 3.91 microseconds or the equivalent of one cross-office channel. A total of 11 intermediate channels, each carrying 24 bits for a total of 264 bits, is circulated in each receive and transmit store at a frequency of 67.584 MHz. The intermediate channels numbered 1 through 8 in frame $F_3$ contain the intelligence being transmitted through the tandem office. The intermediate channel designated S transports the signaling bit for determining a particular trunk supervisory condition.

Intermediate channels designated A and B are reserved for auxiliary control functions in the tandem office. Such information is not transmitted over the trunks or across the office but rather is reserved to satisfy internal control requirements as will be described more fully hereinafter. However, the availability of corresponding channels in the cross-office frame $F_2$ permits the tandem office to compensate for the transition time of a signal between trunks by changing the position or phase of the signal in the intermediate and cross-office frames. This operation also will be clarified in the description hereinafter.

Consider, for example, the course of a message received in trunk channel 1 on incoming trunk 100–1, FIG. 1. Thus an 8-bit word corresponding to a sample of the original message will appear in trunk channel 1 of trunk frame $F_1$, FIG. 2A. If trunk 100–1 is fully loaded at this time, an 8-bit word will appear in each of the 24 trunk channels of trunk frame $F_1$ and a single bit, utilized for framing purposes, will be found in the 193rd bit position.

The equipment in receive memory 120–1 of line group 110–1 will extract the 192 intelligence bits received serially from trunk 100–1 and will interleave them so as to form intermediate frame $F_3$. This is accomplished by placing the first bit received on trunk channel 1 of frame $F_1$ in the first bit position of intermediate channel 1 in frame $F_3$, the second bit received on trunk channel 1 of frame $F_1$ in the first bit position of intermediate channel 2 in frame $F_3$, the third bit on trunk channel 1 of frame $F_1$ in the first bit position of intermediate channel 3 in $F_3$, etc., until all eight bits received on trunk channel 1 have been placed. The process is then repeated for the eight bits received on trunk channel 3 of frame $F_1$ by placing each of these bits in the second bit position of the successive intermediate channels 1 through 8 of frame $F_3$. This interleaving process continues until each of the bits received on the 8-bit trunk channels 1 through 24 of frame $F_1$ occupy interleaved positions in the 24-bit intermediate channels 1 through 8 of frame $F_3$.

The interleaved bits in frame $F_3$ are circulated at a sufficiently high rate that each cycle permits the eight bits initially found in a trunk channel of frame $F_1$ to be placed in one of the 32 cross-office channels of frame $F_2$. Thus considering the eight bits originally found in trunk channel 1 of frame $F_1$, which were disbursed so as to appear in bit position 1 of each of the intermediate channels 1 through 8 in frame $F_3$, these same bits are now extracted from the receive memory and placed in sequential bit positions 1 through 8 of an assigned cross-office channel, e.g., channel 31 in frame $F_2$, FIG. 2B. Thus the bit in position 1 of intermediate channel 1 of frame $F_3$ will appear in position 1 of cross-office channel 31 of frame $F_2$, etc.

Under normal circumstances the cross-office delay which must, of course, have some finite value would prevent this type of transfer operation. However, each cross-office channel comprises 11-bit positions instead of the 8-bit positions in a trunk channel. Advantageously the three additional bit positions, which are not utilized for intelligence transmission, are available to shift the transmitted intelligence through the junctor network 150 in order to compensate for cross-office transmission delay. Thus as seen on FIG. 2D, the eight intelligence bits as stored in a cross-office channel are each shifted one bit position from the positions which they occupied in the intermediate channel, FIG. 2C. Upon completion of cross-office transmission, a second shift of the intelligence bits occurs in the transmit memory, such that the bit arrangement therein corresponds to that illustrated in FIG. 2E. The intelligence as interleaved in frame $F_3$ on the output side of the network in the transmit memory is then detected and reassembled in the proper outgoing trunk frame $F_1$ in the assigned time channels.

It will be beneficial at this point to examine the arrangement of information received on a trunk in order to understand the utility of the signaling bit and its relationship to the intelligence bits. Each trunk frame $F_1$, FIG. 2A, comprises 24 channels which may be assigned to 24 different messages. A sample of each message, consisting of eight bits, is transferred in each repetitive frame interval in the assigned trunk channel. Periodically a trunk frame is utilized exclusively for signaling purposes, so as to permit offices in the network chain to establish and disconnect calling and called stations according to the condition indicated by the signaling bit in the channel assigned to the corresponding call connection. When receipt of a signaling frame is detected in the tandem office, the eighth bit in each channel will identify the signaling condition for the particular call connection utilizing the corresponding channel. Bit positions 1 through 7 in each channel are utilized solely for intelligence transmission. However, the eighth bit position carries signaling information instead of intelligence during the signaling frames.

As will be noted hereinafter the tandem office is arranged to detect the signaling frame and to transfer the content of digit position 8 in each trunk channel to intermediate channel S in frame $F_3$, FIG. 2C. Concurrently a dummy bit is placed in intermediate channel 8 of frame $F_3$ in place of the eighth intelligence bit which was utilized for signaling during this frame interval.

SYNCHRONIZATION

Communication systems in which signals are multiplexed for transmission require some means for determining the precise time of arrival of each discrete bit or sequence of bits in a repetitive frame interval. This may be accomplished in small systems by locking the sampling clocks for the various signal encoding devices to the same master frequency. In a larger network, such as a nationwide telephone system, these signal encoders are scattered throughout the country, and the problem of locking the frequency of all encoders to a master clock becomes exceedingly complex and expensive.

Various techniques are available in the prior art for achieving synchronization including the use of an individual master clock, phase averaging which allows individual sampling clocks for all encoders to be frequency locked without establishing an individual master clock, stable sampling clocks at each encoder location, and pulse stuffing which is a technique for asynchronous multiplexing obviating the need for all encoder clocks to be synchronized. Such synchronization schemes may be noted in Bell System Technical Journal, Vol. 34, Nov., 1965, pp. 1813—1843.

The system arrangement according to this embodiment of the invention will perform satisfactorily in a synchronous or in an asynchronous environment. If the trunks are synchronized, of course, a connection may be completed between two given trunk channels across the tandem office in any one of the 32 cross-office channels. If the clocks in the various offices involved in call connections through the tandem office are not synchronized, the time of receipt of a discrete bit of information will drift with respect to the appearance in the tandem office of the cross-office channel assigned to carry this coded signal. This drift will lead eventually to a situation in which the incoming bits in a particular trunk channel arrive subsequent to the point in time at which the cross-office channel departs from the receiving side of the office. In this instance, of course, the eight bits in the arriving channel are lost. The converse situation, in which the coded information arrives earlier than expected, will result in the same bits being transmitted across the office twice in the same frame interval.

In order to minimize this loss or repetition of information transmitted across the tandem office, the cross-office time channel, in accordance with this illustrative embodiment of the invention, is chosen so as to provide a substantial time interval between the arriving trunk channel and the cross-office channel. Since the same cross-office channel is assigned to both directions of transmission between the connected terminals, it is also necessary to assure that the interval between both trunk channels and the cross-office channel is maximized.

For this purpose certain cross-office channels are forbidden so as to provide the desired margin for phase drift. This margin, which is established as a minimum for all connections, must be less than a quarter of a cross-office frame. If the margin were a quarter of a frame or more, all 16 cross-office channels in a half frame centered roughly on the time of receipt would be forbidden, and two channels whose time of receipt differed by a half frame could not be connected. A margin of 7 cross-office channels (0.216) frame) allows four cross-office channels for those trunk channels received a half frame apart. Thus for a given trunk channel on one trunk, as many as four trunk channels on the other trunk might be connected to it by only four cross-office channels. Other trunk channels would permit a wider choice, up to 18 cross-office channels for trunk channels received simultaneously.

An example may clarify this approach. Consider that clocks at all offices are accurate to one part in $10^8$. Thus at a repetition rate of 8,000 frames per second, two clocks may differ by $2\times10$–$\times$ 8,000 = 0.00016 frames per second, or 0.576 frames per hour. A seven cross-office channel margin would thus guarantee that no words would be lost or repeated during holding times of up to about 20 minutes.

If phase locking appears to be more economical than stable clocks, or if certain trunks must be protected from loss or repetition of pulses for holding times longer than 20 minutes, any or all of the trunks terminating on the network may be synchronized without affecting the operation of the network itself. Thus no binary words will be lost or repeated, regardless of holding time, so long as the total phase drift due to clock control error and delay variation does not exceed the seven cross-office channel margin (about 27 microseconds). Advantageously elastic delays may be utilized if larger phase drifts must be accommodated.

RECEIVE MEMORY (FIG. 3)

All receive memories in the tandem office are similarly constituted and operate in the same manner. Thus receive memory 120–1 in line group 110–1 terminating trunk 100–1 is selected for the detailed analysis. Its object is to place every bit received on the incoming path of trunk 100–1 in a circulating store 370 where it can be accessed according to its preassigned channel number in any cross-office time channel without regard to its time of receipt in the receive memory. Trunk interface circuit 301 serves to identify the framing bits and the signaling frames, to remove jitter from the signal pulse stream and to convert the incoming bipolar signal format to a unipolar format. Thus its outputs to the other components of receive memory 120–1 include the incoming bit stream on lead 302; a signal on one out of eight trunk bit leads in cable 303 indicating which particular bit is being received; an indication on lead 304 as to whether the information was received in an odd or an even trunk channel; an indication on lead 305 of the arrival of the framing bit; and finally a signal on lead 306 indicating that a signaling frame is being received. The trunk interface circuit 301 utilized circuitry well known in the art arranged in the manner described in the aforementioned Vol. 34 BSTJ, 1965, article to drive the indicated signals on leads 302—306.

A small elastic store is employed to remove jitter which is encountered in the transmission of multiplexed coded information. In a long digital transmission system, there is an accumulation of jitter arising from the dependence of the phase of the timing signal at each regenerative repeater on the pulse pattern. The contribution of each repeater to the jitter problem is small, but the overall effect can cause a significant transmission impairment. The elastic store is loaded at the transmission rate of the receive path of trunk 100–1 and unloaded in synchronism with the 1.544 MHz. transmission rate utilized by the tandem office on the transmit path of each of the trunks.

The average number of bits contained in the elastic store will gradually change as the phase of the incoming bit stream drifts with respect to the office clock. When a drift of one pulse duration has accumulated, the content of the elastic store is adjusted by skipping the readout of the next framing pulse on lead 305 or by reading the next framing pulse twice if the content of the elastic store is depleted. In either case, the omission or repetition of the framing pulse is indicated on lead 305, and as noted hereinafter, counters in the receive memories are adjusted to provide the correct trunk indications in the following frame. Advantages of this retiming operation will be discussed hereinafter.

After leaving trunk interface 301, each 8-bit word is transmitted to odd word store 311 or even word store 312 through write gates 310. As their names imply, the 8-bit words are written alternately in the odd word store 311 and even word store 312 depending upon the odd or even trunk channels in which the 8-bit words arrive. This may be accomplished simply by enabling the write gates 310 leading to odd word store 311 whenever a pulse of a particular polarity is received on lead 304. Similarly in the absence of a pulse on lead 304 write gate 310 will direct the eight bits in the corresponding channel to even word store 312. Subsequently, odd and even word stores 311 and 312 are unloaded through read gates 320 under control of address logic 330 and transfer logic 340. The write and read gates 310 and 320 may comprise conventional logic coincidence gates as known in the art. Similarly odd and even word stores 311 and 312 may comprise conventional flip-flop registers.

Figure 2D:
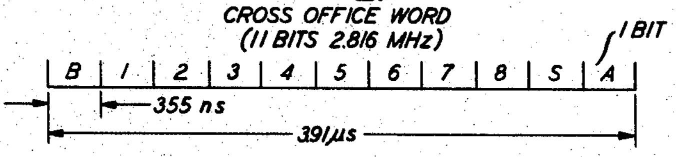
Figure 2E:
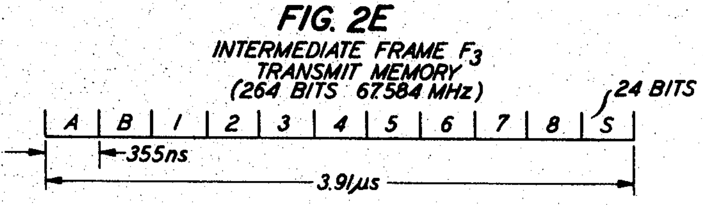

Intermediate store 370 to which the output of read gates 320 is directed, advantageously may comprise a delay line, such as a glass rod ultrasonic delay line as known in the art, which has a delay of approximately 3.9 microseconds, the length of intermediate frame $F_3$, FIG. 2C, and the equivalent of one cross-office channel as depicted in FIG. 2D. The bit rate of intermediate store 370 is 67.584 MHz. to complete one cycle through the 264 bits stored therein in the allotted 3.9 microseconds. New data received from trunk 100–1 is transferred into intermediate store 370 from read gates 320 through AND gate 321 and OR gate 322, such logic gates being well known in the art. Data is recirculated via inhibit gate 371 and OR gate 322. The output of intermediate store 370 is available to selectors 130–1 through **130–*t* and to scanner 140, these selectors and scanner all being included in trunk group 110–1**, FIG. 1.

Transfer logic 340 comprises conventional logic circuitry arranged so as to determine when each 8-bit work is to be transferred from store 311 or store 312 to intermediate store

TIMING (FIGURES 2A—2E)

Continuing with the specific examples to illustrate this embodiment of our invention, the trunk frame $F_1$, as depicted in FIG. 2A, is composed of 24 trunk channels of eight bits each plus one framing bit for a total of 193 serially transmitted bits. Assuming a trunk transmission rate of 1.544 MHz., the duration of each trunk frame $F_1$, as indicated in FIG. 2A, is 125 microseconds, and of each 8-bit trunk channel is 5.18 microseconds.

This trunk frame rate established the internal frame rates for the tandem office. Thus the cross-office frame $F_2$, FIG. 2B, comprises 32 channels of 11 bits each for a total of 352 bits. Since the frame duration of 125 microseconds coincides with the trunk frame duration, the frequency of cross-office transmission is increased to 2.816 MHz. in order to accommodate the increased number of transmitted bits. In this instance each channel has a duration of 3.91 microseconds.

An intermediate frame rate is utilized in the receive and transmit memories to provide an interface between the trunk and cross-office frame rates. This intermediate frame $F_3$ is illustrated in FIGS. 2C and 2E. The duration of frame $F_3$ is 3.91 microseconds or the equivalent of one cross-office channel. A total of 11 intermediate channels, each carrying 24 bits for a total of 264 bits, is circulated in each receive and transmit store at a frequency of 67.584 MHz. The intermediate channels numbered 1 through 8 in frame $F_3$ contain the intelligence being transmitted through the tandem office. The intermediate channel designated S transports the signaling bit for determining a particular trunk supervisory condition.

Intermediate channels designated A and B are reserved for auxiliary control functions in the tandem office. Such information is not transmitted over the trunks or across the office but rather is reserved to satisfy internal control requirements as will be described more fully hereinafter. However, the availability of corresponding channels in the cross-office frame $F_2$ permits the tandem office to compensate for the transition time of a signal between trunks by changing the position or phase of the signal in the intermediate and cross-office frames. This operation also will be clarified in the description hereinafter.

Consider, for example, the course of a message received in trunk channel 1 on incoming trunk 100–1, FIG. 1. Thus an 8-bit word corresponding to a sample of the original message will appear in trunk channel 1 of trunk frame $F_1$, FIG. 2A. If trunk 100–1 is fully loaded at this time, an 8-bit word will appear in each of the 24 trunk channels of trunk frame $F_1$ and a single bit, utilized for framing purposes, will be found in the 193rd bit position.

The equipment in receive memory 120–1 of line group 110–1 will extract the 192 intelligence bits received serially from trunk 100–1 and will interleave them so as to form intermediate frame $F_3$. This is accomplished by placing the first bit received on trunk channel 1 of frame $F_1$ in the first bit position of intermediate channel 1 in frame $F_3$, the second bit received on trunk channel 1 of frame $F_1$ in the first bit position of intermediate channel 2 in frame $F_3$, the third bit on trunk channel 1 of frame $F_1$ in the first bit position of intermediate channel 3 in $F_3$, etc., until all eight bits received on trunk channel 1 have been placed. The process is then repeated for the eight bits received on trunk channel 3 of frame $F_1$ by placing each of these bits in the second bit position of the successive intermediate channels 1 through 8 of frame $F_3$. This interleaving process continues until each of the bits received on the 8-bit trunk channels 1 through 24 of frame $F_1$ occupy interleaved positions in the 24-bit intermediate channels 1 through 8 of frame $F_3$.

The interleaved bits in frame $F_3$ are circulated at a sufficiently high rate that each cycle permits the eight bits initially found in a trunk channel of frame $F_1$ to be placed in one of the 32 cross-office channels of frame $F_2$. Thus considering the eight bits originally found in trunk channel 1 of frame $F_1$, which were disbursed so as to appear in bit position 1 of each of the intermediate channels 1 through 8 in frame $F_3$, these same bits are now extracted from the receive memory and placed in sequential bit positions 1 through 8 of an assigned cross-office channel, e.g., channel 31 in frame $F_2$, FIG. 2B. Thus the bit in position 1 of intermediate channel 1 of frame $F_3$ will appear in position 1 of cross-office channel 31 of frame $F_2$, etc.

Under normal circumstances the cross-office delay which must, of course, have some finite value would prevent this type of transfer operation. However, each cross-office channel comprises 11-bit positions instead of the 8-bit positions in a trunk channel. Advantageously the three additional bit positions, which are not utilized for intelligence transmission, are available to shift the transmitted intelligence through the junctor network 150 in order to compensate for cross-office transmission delay. Thus as seen on FIG. 2D, the eight intelligence bits as stored in a cross-office channel are each shifted one bit position from the positions which they occupied in the intermediate channel, FIG. 2C. Upon completion of cross-office transmission, a second shift of the intelligence bits occurs in the transmit memory, such that the bit arrangement therein corresponds to that illustrated in FIG. 2E. The intelligence as interleaved in frame $F_3$ on the output side of the network in the transmit memory is then detected and reassembled in the proper outgoing trunk frame $F_1$ in the assigned time channels.

It will be beneficial at this point to examine the arrangement of information received on a trunk in order to understand the utility of the signaling bit and its relationship to the intelligence bits. Each trunk frame $F_1$, FIG. 2A, comprises 24 channels which may be assigned to 24 different messages. A sample of each message, consisting of eight bits, is transferred in each repetitive frame interval in the assigned trunk channel. Periodically a trunk frame is utilized exclusively for signaling purposes, so as to permit offices in the network chain to establish and disconnect calling and called stations according to the condition indicated by the signaling bit in the channel assigned to the corresponding call connection. When receipt of a signaling frame is detected in the tandem office, the eighth bit in each channel will identify the signaling condition for the particular call connection utilizing the corresponding channel. Bit positions 1 through 7 in each channel are utilized solely for intelligence transmission. However, the eighth bit position carries signaling information instead of intelligence during the signaling frames.

As will be noted hereinafter the tandem office is arranged to detect the signaling frame and to transfer the content of digit position 8 in each trunk channel to intermediate channel S in frame $F_3$, FIG. 2C. Concurrently a dummy bit is placed in intermediate channel 8 of frame $F_3$ in place of the eighth intelligence bit which was utilized for signaling during this frame interval.

SYNCHRONIZATION

Communication systems in which signals are multiplexed for transmission require some means for determining the precise time of arrival of each discrete bit or sequence of bits in a repetitive frame interval. This may be accomplished in small systems by locking the sampling clocks for the various signal encoding devices to the same master frequency. In a larger network, such as a nationwide telephone system, these signal encoders are scattered throughout the country, and the problem of locking the frequency of all encoders to a master clock becomes exceedingly complex and expensive.

Various techniques are available in the prior art for achieving synchronization including the use of an individual master clock, phase averaging which allows individual sampling clocks for all encoders to be frequency locked without establishing an individual master clock, stable sampling clocks at each encoder location, and pulse stuffing which is a technique for asynchronous multiplexing obviating the need for all encoder clocks to be synchronized. Such synchronization schemes may be noted in Bell System Technical Journal, Vol. 34, Nov., 1965, pp. 1813—1843.

The system arrangement according to this embodiment of the invention will perform satisfactorily in a synchronous or in an asynchronous environment. If the trunks are synchronized, of course, a connection may be completed between two given trunk channels across the tandem office in any one of the 32 cross-office channels. If the clocks in the various offices involved in call connections through the tandem office are not synchronized, the time of receipt of a discrete bit of information will drift with respect to the appearance in the tandem office of the cross-office channel assigned to carry this coded signal. This drift will lead eventually to a situation in which the incoming bits in a particular trunk channel arrive subsequent to the point in time at which the cross-office channel departs from the receiving side of the office. In this instance, of course, the eight bits in the arriving channel are lost. The converse situation, in which the coded information arrives earlier than expected, will result in the same bits being transmitted across the office twice in the same frame interval.

In order to minimize this loss or repetition of information transmitted across the tandem office, the cross-office time channel, in accordance with this illustrative embodiment of the invention, is chosen so as to provide a substantial time interval between the arriving trunk channel and the cross-office channel. Since the same cross-office channel is assigned to both directions of transmission between the connected terminals, it is also necessary to assure that the interval between both trunk channels and the cross-office channel is maximized.

For this purpose certain cross-office channels are forbidden so as to provide the desired margin for phase drift. This margin, which is established as a minimum for all connections, must be less than a quarter of a cross-office frame. If the margin were a quarter of a frame or more, all 16 cross-office channels in a half frame centered roughly on the time of receipt would be forbidden, and two channels whose time of receipt differed by a half frame could not be connected. A margin of 7 cross-office channels (0.216) frame) allows four cross-office channels for those trunk channels received a half frame apart. Thus for a given trunk channel on one trunk, as many as four trunk channels on the other trunk might be connected to it by only four cross-office channels. Other trunk channels would permit a wider choice, up to 18 cross-office channels for trunk channels received simultaneously.

An example may clarify this approach. Consider that clocks at all offices are accurate to one part in $10^8$. Thus at a repetition rate of 8,000 frames per second, two clocks may differ by 2×10–X 8,000 = 0.00016 frames per second, or 0.576 frames per hour. A seven cross-office channel margin would thus guarantee that no words would be lost or repeated during holding times of up to about 20 minutes.

If phase locking appears to be more economical than stable clocks, or if certain trunks must be protected from loss or repetition of pulses for holding times longer than 20 minutes, any or all of the trunks terminating on the network may be synchronized without affecting the operation of the network itself. Thus no binary words will be lost or repeated, regardless of holding time, so long as the total phase drift due to clock control error and delay variation does not exceed the seven cross-office channel margin (about 27 microseconds). Advantageously elastic delays may be utilized if larger phase drifts must be accommodated.

RECEIVE MEMORY (FIG. 3)

All receive memories in the tandem office are similarly constituted and operate in the same manner. Thus receive memory 120–1 in line group 110–1 terminating trunk 100–1 is selected for the detailed analysis. Its object is to place every bit received on the incoming path of trunk 100–1 in a circulating store 370 where it can be accessed according to its preassigned channel number in any cross-office time channel without regard to its time of receipt in the receive memory. Trunk interface circuit 301 serves to identify the framing bits and the signaling frames, to remove jitter from the signal pulse stream and to convert the incoming bipolar signal format to a unipolar format. Thus its outputs to the other components of receive memory 120–1 include the incoming bit stream on lead 302; a signal on one out of eight trunk bit leads in cable 303 indicating which particular bit is being received; an indication on lead 304 as to whether the information was received in an odd or an even trunk channel; an indication on lead 305 of the arrival of the framing bit; and finally a signal on lead 306 indicating that a signaling frame is being received. The trunk interface circuit 301 utilized circuitry well known in the art arranged in the manner described in the aforementioned Vol. 34 BSTJ, 1965, article to drive the indicated signals on leads 302—306.

A small elastic store is employed to remove jitter which is encountered in the transmission of multiplexed coded information. In a long digital transmission system, there is an accumulation of jitter arising from the dependence of the phase of the timing signal at each regenerative repeater on the pulse pattern. The contribution of each repeater to the jitter problem is small, but the overall effect can cause a significant transmission impairment. The elastic store is loaded at the transmission rate of the receive path of trunk 100–1 and unloaded in synchronism with the 1.544 MHz. transmission rate utilized by the tandem office on the transmit path of each of the trunks.

The average number of bits contained in the elastic store will gradually change as the phase of the incoming bit stream drifts with respect to the office clock. When a drift of one pulse duration has accumulated, the content of the elastic store is adjusted by skipping the readout of the next framing pulse on lead 305 or by reading the next framing pulse twice if the content of the elastic store is depleted. In either case, the omission or repetition of the framing pulse is indicated on lead 305, and as noted hereinafter, counters in the receive memories are adjusted to provide the correct trunk indications in the following frame. Advantages of this retiming operation will be discussed hereinafter.

After leaving trunk interface 301, each 8-bit word is transmitted to odd word store 311 or even word store 312 through write gates 310. As their names imply, the 8-bit words are written alternately in the odd word store 311 and even word store 312 depending upon the odd or even trunk channels in which the 8-bit words arrive. This may be accomplished simply by enabling the write gates 310 leading to odd word store 311 whenever a pulse of a particular polarity is received on lead 304. Similarly in the absence of a pulse on lead 304 write gate 310 will direct the eight bits in the corresponding channel to even word store 312. Subsequently, odd and even word stores 311 and 312 are unloaded through read gates 320 under control of address logic 330 and transfer logic 340. The write and read gates 310 and 320 may comprise conventional logic coincidence gates as known in the art. Similarly odd and even word stores 311 and 312 may comprise conventional flip-flop registers.

Intermediate store 370 to which the output of read gates 320 is directed, advantageously may comprise a delay line, such as a glass rod ultrasonic delay line as known in the art, which has a delay of approximately 3.9 microseconds, the length of intermediate frame $F_3$, FIG. 2C, and the equivalent of one cross-office channel as depicted in FIG. 2D. The bit rate of intermediate store 370 is 67.584 MHz. to complete one cycle through the 264 bits stored therein in the allotted 3.9 microseconds. New data received from trunk 100–1 is transferred into intermediate store 370 from read gates 320 through AND gate 321 and OR gate 322, such logic gates being well known in the art. Data is recirculated via inhibit gate 371 and OR gate 322. The output of intermediate store 370 is available to selectors 130–1 through **130–*t* and to scanner 140, these selectors and scanner all being included in trunk group 110–1**, FIG. 1.

Transfer logic 340 comprises conventional logic circuitry arranged so as to determine when each 8-bit work is to be transferred from store 311 or store 312 to intermediate store 370. The output of transfer logic 340 on lead 341, together with the output of comparison circuit 360 through AND gate 346, determines the time of transfer from read gates 320 to intermediate store 370. The output of transfer logic 340 on lead 345 controls the advance of counter 350. Similarly the output of transfer logic 340 on lead 344 serves to initialize counter 350.

Counter 350 may comprise any counter circuit known in the art capable of counting up to 24, the count required to identify the 24 trunk channels in frame $F_1$, FIG. 2. An indication of the content of the least significant bit in counter 350, as evidenced by a signal on lead 351, will serve to identify to transfer logic 340 and read gates 320 the odd or even count currently contained in counter 350. This indication, of course, may then be utilized to identify the odd or even channel being received on trunk 100–1. Similarly the most significant bit output of counter 350 on lead 354 may be utilized to indicate the termination of a frame $F_1$.

Transfer logic 340 also receives a signal on lead 332 defining each 8-bit interval and a signal on lead 348 identifying the arrival of intermediate channel A, which follows channel S in which the signaling bit will be stored.

The composition of transfer logic 340 may best be understood by a review of the logic operations which it performs. Upon receipt of a signal on lead 348 from office clock 170, indicating that intermediate channels 1–8 and signaling channel S in frame $F_3$, FIG. 2C, have passed, the logic at the set input of flip-flop 343 compares the least significant bit in counter 350, as identified by the signal on lead 351, with the odd or even channel indication received from trunk interface 301 on leads 304 and 307. Counter 350 contains the number of the channel previously received from trunk 100–1. Therefore a mismatch indicates that the content of the next channel is still being received from trunk 100–1, and flip-flop 343 will remain in its reset state. Upon detection of a match, indicating receipt of the entire word in the next trunk channel, flip-flop 343 is set and its set input will advance counter 350 via lead 345. The set output of flip-flop 343 sets flip-flop 342 in conjunction with a signal from clock 180–1, indicating the presence of intermediate channel 1, and with a signal from counter 350 on lead 354, indicating whether the current count is more or less than half the total count. The purpose of this logic, including a delay device, is to transfer early trunk channels at a point earlier in time than the transfer of the late trunk channels. This arrangement provides sufficient operating margins for rise and fall times of signals from group clock 180–1 defining the intermediate channels. Without such control, these clock signals and the functions they control would have to coincide precisely with the intermediate store channels in order to separate bit 24 in each intermediate channel from bit 1 of the next channel. The output of flip-flop 342 on lead 341 provides the signal for the actual transfer operation. A signal on lead 332, designating trunk channel 8, serves to reset flip-flops 342 and 343 to end the transfer operation.

If transfer logic 340 is in its inactive state when an indication is received on lead 305 from trunk interface circuit 301, identifying the arrival of the framing bit, a signal will be transmitted to counter 350 via lead 344 serving to initialize the counter in preparation for the count of the next frame of 24 trunk channels.

Figure 3:
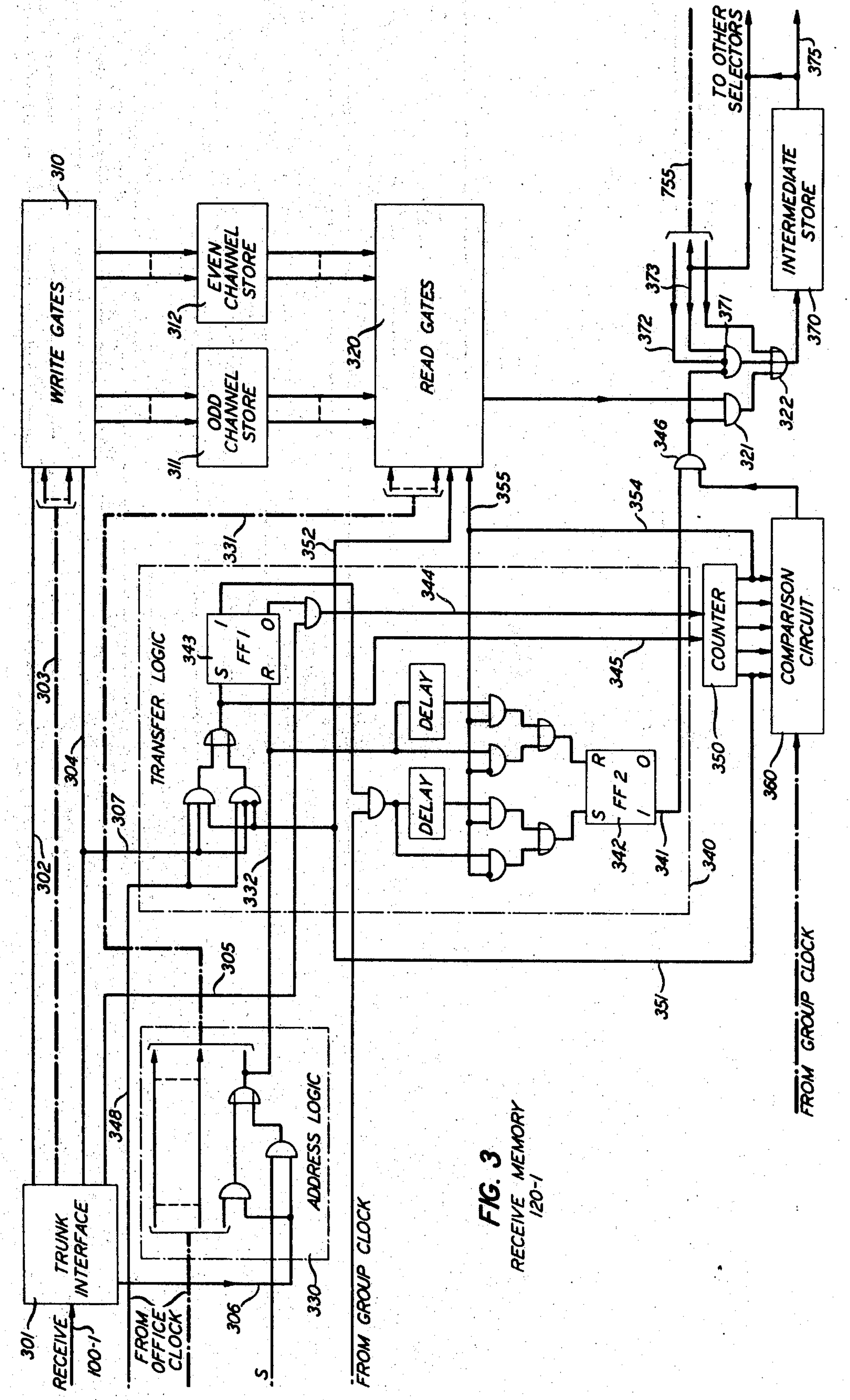

Address logic 330 serves to convert the incoming trunk channel format into the intermediate channel format of frame $F_3$ as utilized in store 370. The incoming trunk channel format comprises eight bits, the eighth bit of which may be intelligence or signaling dependent upon whether or not a signaling frame is present. This trunk channel format is converted into a format including eight intelligence bit intervals 1—8, one signaling bit interval S and two auxiliary bit intervals A and B, as indicated in FIG. 2C. The input to address logic 330 consists of a sequence of nine signals from office clock 170 indicating the particular channel interval of the intermediate frame being accessed. An indication of the signaling frame is received from trunk interface 301 via lead 306. Eight output leads from address logic 330 (cable 331) are available to carry an indication of the particular intermediate channel designated by office clock 170 to read gates 320, indicating which of the eight bits is to be read out for transfer into intermediate store 370. During a nonsignaling frame, the eight outputs coincide with the first eight inputs to address logic 330 from office clock 170. This operation, of course, will result in transfer of the eight bits received in the current trunk channel through buffer read gates 320 at the appropriate times. In a signaling frame, however, only the first seven outputs are coincident with the first seven inputs to address logic 330. The arrangement of logic gates, as noted in FIG. 3, is such that the signaling frame signal on lead 306 inhibits the eighth input, and instead enables the eighth output to be delivered upon receipt of the ninth or signaling bit on lead S.

The signaling bit is regenerated in intermediate store 370 during nonsignaling frames, because transfer logic 340 goes into its inactive state before the signaling channel S in frame $F_3$ is accessed. The eight bit in a signaling frame is not regenerated although transfer logic 340 at that time is in its active or transferring state. This is true because there is no output from read gates 320 absent an input address at this time on cable 331 from address logic 330. Under these conditions read gates 320 are arranged to deliver a binary "1" to intermediate store 370 via AND gate 321 and OR gate 322. This choice of a "1" as the dummy eighth bit will minimize introduction of noise when a seven bit intelligence word must be transmitted in a nonsignaling frame.

As indicated previously, the function of counter 350 is to indicate the trunk channel number of the eighth bit word being transferred to intermediate store 370. It is entirely under the control of transfer logic 340 which can either advance it or initialize it. Its least significant bit is delivered via lead 351 to transfer logic 340 and via lead 352 to read gates 320 to indicate which of the odd and even word stores 311 and 312 is to be read out. The binary count of 24 is represented on five distinct output leads of counter 350. This 5-digit representation is applied to comparison circuit 360 where it is compared with a 5-digit parallel, binary input from trunk group clock 180–1. When a match occurs, comparison circuit 360 provides an output which enables AND gate 342 coincident with receipt of an output from transfer logic 340 on lead 341.

The operation of receive memory 120–1 may best be understood by considering that the eight bits in trunk channel 23 have just been received in trunk interface circuit 301. These eight bits will be transferred in sequence via lead 302 through write gates 310 according to the addresses on cable 303, to odd word store 312, as determined by the signal on lead 304, and through read gates 320 to intermediate store 370 in conjunction with signals from address logic 330, transfer logic 340, counter 350 and comparison circuit 360. Transfer logic 340, upon receipt of a signal on lead 348 from office clock 170 indicating the arrival of intermediate channel A, prepared to advance counter 350 via lead 345 so as to reflect receipt of the next trunk channel, channel 24. The output of counter 350 on lead 351 is compared with the output of trunk interface circuit 301 received on lead 307. A match indicates that all of trunk channel 24 has been received in even word store 312 and serves to advance counter 350 via lead 345. It also provides one input to AND gate 342 in order to prepare for the read out of even word store 312. When a match occurs in comparison circuit 360, indicating that the count reflected by group clock 180–1 agrees with the count contained in counter 350 for trunk channel 24, AND gate 342 is enabled, and the bit by bit read out of even word store 312 proceeds through read gates 320 under control of the bit transfer outputs of address logic 330 on cable 331.

It is assumed, in this instance, that trunk channel 24 contained eight intelligence bits. These bits, as stored in even word buffer 312, are retrieved in sequence upon receipt of the eight sequential bit position signals from address logic 330 via cable 331 at the corresponding read gates 320. The operation is synchronized such that each serial output of read gates 320 through AND gate 321 and OR gate 322 will be received in intermediate store 370 precisely at the time when the 24th bit position of each intermediate channel is in a position to receive the incoming bit. This is possible, of course, since store 370 operates at a considerably higher frequency than the output of read gates 320 provides digits to it. In fact, in the interval between successive bits from read gates 320, store 370 circulates its content through one complete cycle of operation. The result is that each of the eight bits received on trunk channel 24 will be distributed through an entire intermediate frame $F_3$ so as to appear in circulating store 370 in the 24th bit position of intermediate channels numbered 1 through 8.

The framing bit is now received from trunk 100–1 in trunk interface circuit 301. Since the next frame is a signaling frame in this example, leads 305 and 306 from trunk interface circuit 301 will reflect, respectively, the framing bit and the presence of the signaling frame. The eighth bit signal from address logic 330 on lead 332 serves to disable the read out of read gates 320, and the framing bit on lead 305 and clock bit on lead 348 will enable transfer logic 340 to advance and initialize counter 350 so as to reflect the presence of incoming trunk channel 1.

The process is now repeated for each 8-bit trunk channel in the incoming signaling frame with the exception that address logic 330 now converts its 8-bit input to a 9-bit output, the ninth bit position reflecting the signaling bit. Also since channel 1 is involved, odd word store 311 will be read out at this time through read gates 320. Since the eight outgoing bit has been robbed in order to provide space for the signaling bit, the eighth bit position now is filled by an arbitrary "1" which is inserted at the output of read gates 320.

The purpose of odd and even word stores 311 and 312 will be evident from consideration of FIG. 9. Line 1 in this FIG. indicates the arrival of trunk channels 4 through 15 at trunk interface circuit 301. The information in these channels is then directed alternately to the even word store, as shown on line 2, and to the odd word store as shown on line 3. As noted earlier, the entire frame $F_3$ corresponds to one cross-office channel of which channels 27—32 and 1—8 are shown on line 4. Lines 5 and 6 indicate the manner in which even word store 312 and odd word store 311, respectively, are unloaded for transfer into intermediate store 370. The staggered unloading pattern is required, of course, to assure that all trunk channels coincide with a cross-office channel as each bit is entered in intermediate store 370, since a trunk channel is longer in duration than a cross-office channel. The final resultant is a loading pattern in accordance with that illustrated on line 7 of FIG. 9.

SELECTOR (FIG. 4)

Figure 4:
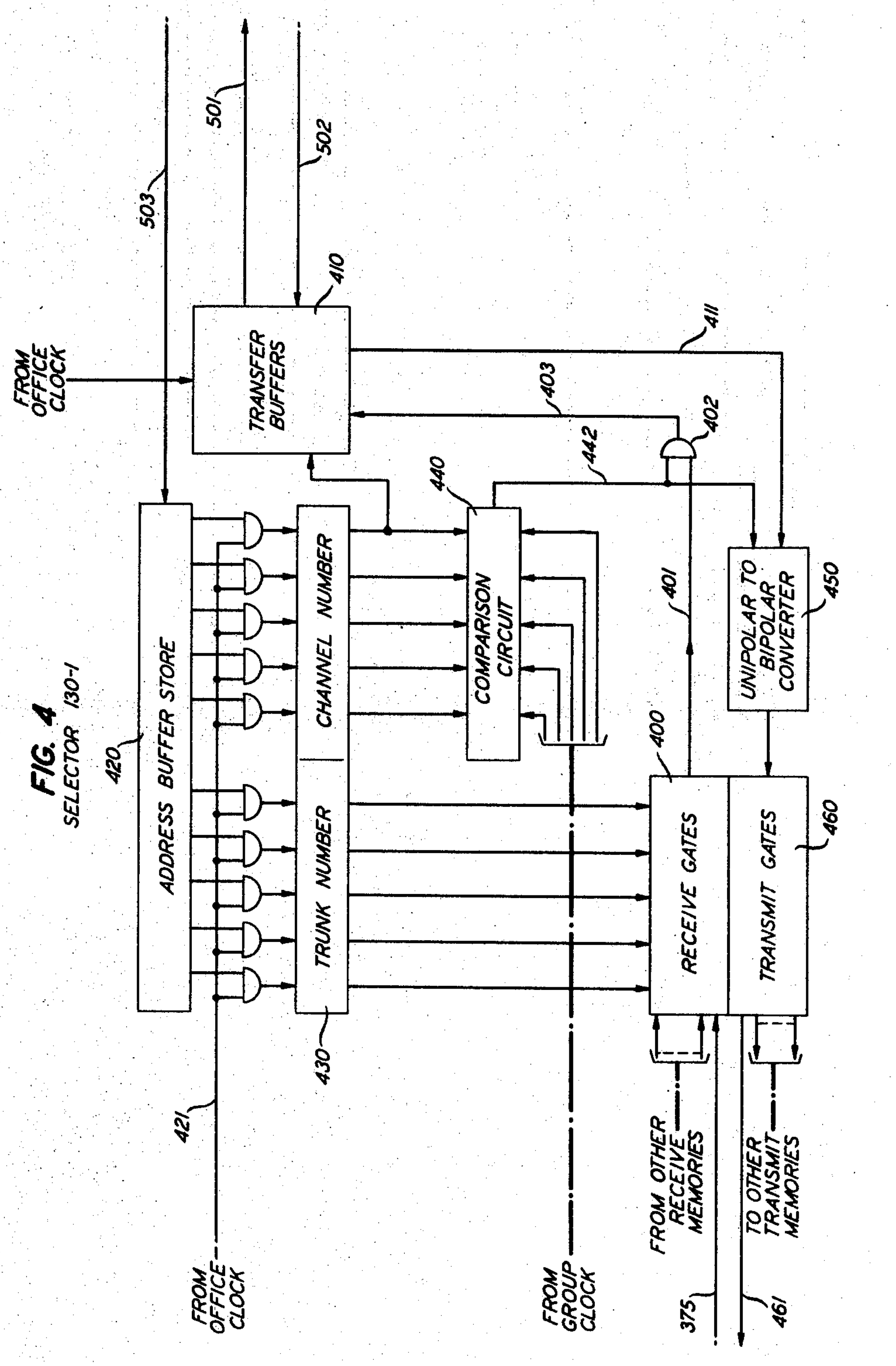

Each trunk group of 32 trunks contains 33 selectors, each selector being associated with one end of a junctor including both ends of one intragroup junctor. These selectors provide the junctors with access to all 32 trunks in the trunk group. The selector has the capacity to access any trunk channel in any cross-office channel. The primary purpose of the selector of course, is to access the receive and transmit stores in the corresponding trunk group simultaneously, utilizing a single address register for this purpose, and to provide a two-way talking path for the completed connections. The functional components required to perform this selector operation, as illustrated in FIG. 4 for selector 130–1, include receive gates 400, transfer buffers 410, address buffer store 420, address register 430 including a trunk number portion and a channel number portion, comparison circuit 440, a unipolar-to-bipolar conversion circuit 450, and transmit gates 460. Various of these components receive control signals from office clock 170 and group clock 18–1 as described in detail hereinafter. All of these components contain logic circuitry familiar to the art, which circuitry of course does not constitute a part of this invention.

Receive gates 400, under control of a 5-bit binary address received from the trunk number portion of address register 430, serves to select one out of the 32 trunks in the corresponding trunk group 110–1. Having made this selection the 68 MHz. output of the corresponding circulation store 370 in trunk receive memory 120–1 from which the odd word is being accepted, is transferred into selector 130–1. Receive gates 400 may comprise AND gates or transmission gates familiar to the art.

Transmit gates 460 also comprise logic gates controlled by the same binary output of the trunk number portion of address register 430. Of course, in this instance access is given to the intermediate store in the transmit memory corresponding to the selected trunk. Transmit gate 460 must transfer not only a binary indication of the particular intelligence signal but also an indication as to whether the intelligence signal is to be stored for the first time or regenerated. This information may be transferred in bipolar form in which case the type of gate utilized in transmit gates 460, as known in the art, is somewhat more complex than the AND gates utilized in receive gates 400. The bipolar signal in this instance might reflect for example, the binary "1" as a positive pulse, the binary "0" as a negative pulse, and the absence of a pulse to indicate that regeneration is desired. Alternatively, simple AND gates might be utilized, in which instance the intelligence bit would be transmitted through one set of AND gates and the regeneration indication through a second set of AND gates. In the latter case, unipolar-to-bipolar conversion circuit 450 would, of course, be eliminated.

Transfer buffers 410 comprise storage circuits, as known in the art, which permit the storage of four intelligence or signaling bits simultaneously. These stored bits would include that being read through receive gates 400, that written via transmit gates 460, the bit that was read in the previous cross-office channel and is currently being sent cross-office, and finally the bit being received cross-office for transfer to the assigned transmit memory in the following cross-office channel. Transfer buffers 410 include the necessary storage and steering logic circuitry suitable to perform these functions. The timing of these operations within transfer buffers 410 is arranged to run early for the early channels and late for the late channels under control of the channel number portion of address register 430.

Address buffer store 420 is a serial-to-parallel converter which accepts a 10-bit address serially from the corresponding junctor at the cross-office rate, and delivers the address in parallel to the address register 430 at the end of the cross-office channel. The timing of the transfer between address buffer store 420 and address register 430 is under control of office clock 170 via lead 421 through a series of AND gates.

Address register 430, as indicated previously, is divided into two distinct sections, the trunk portion containing a 5-bit trunk number from 1 to 32 which controls the receive and transmit gates 400 and 460, respectively, and a channel portion holding a 5-bit channel number from 1 to 24, which designation is subsequently presented to compare circuit 440. The channel portion also is purposely designed to permit the storage of channel numbers greater than 24, which numbers are stored when no output is desired. This situation occurs, of course, when a particular trunk is idle. Address buffer store 420 may comprise a shift register, and address register 430 may comprise a series of flip-flops, which circuitry is well known in the art.

As in the receive memory, comparison circuit 440 compares the channel number held in the channel portion of address register 430 with a 5-bit binary input from the group clock indicating which cross-office channel is currently accessible, and upon occurrence of a match delivers an output which causes both reading and writing to take place via lead 442.

Components operating at the 68 MHz. frequency include comparison circuit 440, receive gates 400, transmit gates 460 and the unipolar-to-bipolar converter 450. All other components in the selector circuit operate at the cross-office frequency of 2.816 MHz.

The selector operation may be understood by focusing on one particular cross-office channel. Thus, for example, consider that the content of cross-office channel 3, FIG. 2B, is currently being transferred through receive gates 400 into transfer buffers 410 via lead 401, AND gate 402 and lead 403. This particular 11-bit word arrives at the 68 MHz. frequency such that the entire word is received within the cross-office channel interval designated in FIG. 2B.

While this 11-bit word is being stored in transfer buffers 410, another 11-bit word is being transferred through transmit gates 460 for storage in the transmit memory corresponding to the receive memory from which the 11 11-bit word is currently being received in the selector. As indicated the outgoing 11-bit word is in unipolar form in transfer buffers 410 and is converted to bipolar form via lead 411 and unipolar-to-bipolar converter 450, prior to transfer through transmit gates 460. While transfer buffers 410 receive the 11-bit word in cross-office channel 3, the word received in cross-office channel 2 is being transferred over the associated junctor to another selector. Concurrently, the 11-bit word transmitted from the other selector in cross-office channel 2 is being received via the corresponding junctor in transfer buffers 410.

The associated junctor determines the address to which the 11-bit word currently being transferred over the junctor will be directed in the next cross-office channel. It should be emphasized that the channel portion of the address received from the junctor refers to the trunk channel and not to the cross-office channel. Since there are 24 trunk channels in a frame $F_1$, any count above 24 provided by the channel number portion of address register 430 will fail to produce an output from comparison circuit 440, indicating thereby that the corresponding cross-office channel on the junctor is idle.

JUNCTORS (FIGURE 5)

Junctor switching network 150 comprises a group of junctors 151–1 through !**151–*n*, FIG. 1**, each junctor serving to interconnect a pair of selectors. Different trunk groups are connected by intergroup junctors while one intragroup junctor is provided for each trunk group. Thus there are slightly more than one-half as many junctors as trunks in the system.

In addition to interconnecting selectors, the junctors retain a knowledge of existing connections between trunks. Thus as noted in FIG. 5, the functional components of each junctor include connecting paths 501 and 502 for transfer of intelligence in opposite directions, trunk address stores 505, control paths 503 and 504 for transmitting particular trunk addresses to the selectors at opposite ends of the junctor, and path tracing logic 520 which is utilized to retain complete information on connections through the network when such information is not retained by central control 160.

It may be noted that the junctors themselves do not perform switching functions. Thus the connecting paths 501 and 502 each comprise a pair of wires providing a solid circuit path between transfer buffers in the selectors at opposite ends of the junctor paths. Address stores 505 comprise two circulating stores, each composed of a delay line having a 125 microsecond delay and operating at the 2.8 MHz. cross-office bit rate. Each store has a capacity of 352 bits, of which only 320 are used for addresses. Each store operates in synchronism with the cross-office frame. Since the function of the two stores is the same, viz., to provide trunk addresses for use by a corresponding selector, their operations may be interleaved into a single store. The addresses are written into address stores 505 by address store control circuit 510, comprising various logic circuitry known in the art, including a 20-bit buffer store to hold the trunk addresses temporarily, a 5-bit cross-office channel register, a 3-bit instruction register, and logic circuitry sufficient to perform the read, write, connect and disconnect operations. Information necessary to satisfy these operations is provided by central control 160 and office clock 170.

During a read operation, central control 160 will provide a cross-office channel number to address store control 510 via cable 161. The trunk addresses contained in address stores 505 in that particular cross-office channel are delivered to a temporary store in control circuit 510 during the appearance of this cross-office channel in the prior frame $F_2$ from which they may be removed when required by central control 160. When a connection through the network is to be established in a particular cross-office channel, central control 160 will supply both the trunk addresses to be written in address stores 505 and the cross-office channel in which they are to be stored. When the selected cross-office channel becomes accessible in the circulating address stores 505, central control 160 will verify by comparison that the junctor is idle in that cross-office channel, which condition will be indicated by the presence therein of a trunk channel number above 24. If in this instance, the comparison indicates that the cross-office channel is busy, a trouble signal will be transmitted to central control 160 via cable 161. In the absence of a trouble condition, control circuit 510 will transfer the addresses to address stores 505 in the following cross-office frame. For a disconnect operation, only a cross-office channel number will be provided by central control 160. When the trunk addresses in the designated cross-office channel become accessible in address stores 505, control circuit 510 will simply change the two most significant bits in each of the trunk channel designations so as to produce numbers above 24.

Path tracing logic 520 is utilized when complete information on connections through the network is not retained by central control 160. In this instance after a disconnect signal is received, path tracing logic 520 proceeds to trace a path from the trunk and trunk channel in which the signal was received to the junctor and cross-office channel in which the disconnect operation is to be performed. In order to effect this operation, central 160 will enable the corresponding trunk scanner to write a "1" in intermediate channel A, FIG. 2C, of the intermediate store in the corresponding receive memory. This "1" then will be transmitted to the appropriate junctor in bit position A of the cross-office work, FIG. 2D, but will not be written in the transmit store at the other end of the connection. Path tracing logic 520 will detect the presence of this "1" in bit position A of the cross-office channel via leads 501 and 525 and will immediately send a signal on lead 521 to control circuit 510. Unless it is busy executing another operation at this time, control circuit 510 will enter the current channel number in its temporary register. Control circuit 510 will then proceed with its operation as though it had received an instruction to read the content of this cross-office channel. Concurrently, path tracing logic 520 will report the identity of the junctor to central control 160.

TRANSMIT MEMORY (FIG. 6)

A transmit memory is provided for each trunk. Thus transmit memories 121–1 through **121–*t*, FIG. 1, serve the corresponding trunks 100–1 through 100–*t*. The transmit memory is similar in operation to the receive memory previously described with the exception that the flow of information is in the opposite direction and the trunk timing is determined by office clock 170 rather than by an independent clock at a distant office. As noted in FIG. 6, the transmit memory comprises bipolar-to-unipolar converters 600, intermediate store 610, write gates 620, odd word store 621, even word store 622, read gates 630, and trunk interface circuit 640**.

Converter 600 is required to accept bipolar signals from the transmit gates in the corresponding selectors, FIG. 4, through OR gates 601. Converter 600 provides two distinct outputs. The write command output on lead 602 is applied to both AND gates 604 and 605, while and binary digit value output on lead 603 is applied only to AND gate 604. Thus with both outputs present, AND gate 604 will be enabled to apply the particular digit value in unipolar form to intermediate store 610 through OR gate 606.

The operation of intermediate store 610 corresponds to that described for the intermediate store in the receive memory except that the writing and regenerating operations are controlled by the selectors rather than by logic within the memory itself. Similarly the word stores and associated gates correspond to those in the receive memory. Write gates 620 in this instance operate at an interrupted cross-office rate, while read gates 630 operate at the trunk rate. Also in this instance, the input to the transmit memory is an "8-bit plus" signal group which is to be converted to an 8-bit intelligence word for transmission over the corresponding trunk or, if a signaling frame is present, a 7-bit intelligence word plus a signaling bit in the eighth bit position. No special logic as described for the receive memory in FIG. 3 are performed in common in office clock 170 for all transmit memories.

Trunk interface circuit 640 operates in opposite fashion to trunk interface circuit 301 in the receive memory. Thus framing pulses as determined by office clock 170 are inserted in the outgoing bit stream on the send path of trunk 100–1, FIG. 6. Also equipment is provided to convert from the unipolar pulse form to the bipolar from utilized on the trunk.

TRUNK SCANNER (FIG. 7)

A trunk scanner is provided for each trunk group 110–1 through 110–*t*, FIG. 1. The primary function of the trunk scanner, such as scanner 140 in trunk group 110–1, is to observe the signaling bits as they arrive on the trunks and to alert central control 160 when a change of state occurs, as indicated by these signaling bits. The trunk scanner also provides access to the auxiliary bits in the circulating stores of the receive and transmit memories. As noted in fig. 7, scanner 140 comprises address counter 700, control register 710, mode control logic 720, scan gates 730, comparison circuits 740, receive gates 750 and transmit gates 760.

Address counter 700 comprises a 10-bit binary counter which is arranged to step through the addresses of all 24 trunk channels in all 32 trunks of the corresponding trunk group 110–1 in response to "advance" signals received from mode control logic 720. Thus, if address counter 700 receives an advance signal in every cross-office channel, it will step through all of the 768 trunk addresses in 3 milliseconds, equivalent to 333 scans per second. Output gates, such as AND gates 701, associated with address counter 700 serve to transfer its content to the address portion, including trunk channel number and trunk number, of control register 710 under the direction of mode control logic 720.

Control register 710 is an 18-bit register divided into a 5-bit channel address section, a 5-bit trunk address section, a 2-bit instruction section, and 6-bit data section. This register receives addresses in parallel from address counter 700 through AND gates, such as gate 701, under control of mode control logic 720. Central control 160 also provides and exercises control over the register 710 inputs via OR gates, such as gate 702. The instruction section of register 710 is set by signals from central control 160 or mode control logic 720 at OR gates 721. Thus central control 160 may achieve a partial or complete change in the content of control register 710 and also may retrieve the entire content or any desired portion thereof.

Mode control logic 720 comprises logic circuitry which serves to change the content of control register 710 in accordance with internal instructions developed during operation in an autonomous mode or in accordance with instructions received from central control 160 at which time the operation will be in a directed mode. These operations, in the autonomous or directed mode, occur during bit intervals 2—7 in each cross-office channel, FIG. 2D, when no signaling or auxiliary bits are accessible in the intermediate stores of the receive and transmit memories.

The logic circuitry in mode control logic 720 is arranged to perform various operations in sequence. Thus, during cross-office bit 2, if mode control logic 720 is in its autonomous mode, three bits of information in the data section of control register 710 are examined via leads 711 through 713. These three bits include the signaling bit in position S of the cross-office channel, received on lead 713, the "halt" bit in position A on lead 712 and the "haltcondition" bit in position B on lead 711, the latter bits being provided initially by central control 160. As noted in FIG. 7, the arrangement of logic gates receiving these signals in mode control logic 720 is such that, if the halt bit is a "1" and the signaling bit is the same as the halt condition bit, mode control logic 720 will send the signal to central control 160 on lead 722. Logic 720 then remains passive until it receives a directed write instruction, which central control 160 will send on lead 723 to flip-flops 724 and 725 to change the halt or halt condition bit, or both, after it has read control register 710. These instructions will be transmitted to the instruction portion of control register 710 via AND gate 726.

During bit 3 of the cross-office channel, if mode control logic 720 is in the autonomous mode and has not halted, it now advances address counter 700 via lead 729. During cross-office channel bit 4, mode control logic 720 in the autonomous mode transfers the content of address counter 700 to the channel and trunk number sections of control register 710.

When an instruction is received from central control 160 on lead 723, mode control logic 720 immediately enters the directed mode by setting both flip-flops 724 and 725. In this directed mode, all of the autonomous mode operations described hereinbefore are inhibited by the setting of flip-flop 724. Mode control logic 720 then waits for the next occurrence of cross-office channel bit 8 which indicates the start of an execution cycle. A clock signal at this time resets flip-flop 725. If the instruction is to read out control register 710, such an operation sill occur during cross-office channel bit 2, with the information retrieved from control register 710 being transferred to central control 160. During cross-office bit 3, if a directed mode instruction has just been executed, the output of AND gate 726 will set the instruction section of control register 710 to "read only" via OR gate 721. In this instance address counter 700 will not be advanced by mode control logic 720, since flip-flop 724 remains in the set state for a period determined by delay 727. Following this delay, flip-flop 724 is reset, and the operation is restored to the autonomous mode.

Delivery of instructions from central control 160 is timed so that an instruction cannot be received before the previous instruction has been executed. If an instruction is received during the execution of an operation in the autonomous mode, the autonomous operation is interrupted. After execution of the directed operation, the autonomous mode of operation is resumed. If a halted trunk scanner receives an instruction that does not change the halt or halt condition bits for the channel on which the halt occurred; e.g., if central control 160 has not had time to recognize the halt signal, the same trunk channel will be read immediately upon resumption of the autonomous mode, and the trunk scanner will be halted again.

The trunk scanner takes one cross-office time channel, approximately 4 microseconds, for each channel scanned in the autonomous mode, excluding halts. If, as described later, a halted scanner is read only during processor interrupts that occur at 5 millisecond intervals, each trunk scanner will be limited to 200 halts per second. A directed read or write operation takes two cross-office time channels if it interrupts an autonomous operation.

Scan gets 730 perform a translation function in addition to transferring information between the intermediate stores in the receive and transmit memories and the data section of control register 710. Each intermediate store contains three bits per trunk channel accessible to the trunk scanner, which bits are stored in three different 24-bit intermediate channels designated S, A, and B, FIG. 2C. The translation and transfer of these bits between the intermediate stores and the data section of control register 710 in the trunk scanner is accomplished in response to coded commands from office clock 170 to scan gates 730, which commands serve to control the operation of receive gates 750 and transmit gates 760 in a particular order.

The 34-bit group code from office clock 170 via cable 733 indicates the particular intermediate channel to which the stored bits being accessed belong. Six 3-digit codes are applied in accordance with the following table I:

TABLE I

| Intermediate Channel Code | Receive Store Intermediate Channel | Transmit Store Intermediate Channel |
|---|---|---|
| 000 | Intelligence | Intelligence. |
| 001 | S-Received Signal | Do. |
| 010 | A-Path Tracing | Do. |
| 011 | B-Miscellaneous | S-Transmitted Signal. |
| 100 | Intelligence | A-Halt. |
| 101 | do | B-Halt Condition. |

The path tracing bit is used to trace a connection through the network when a disconnect signal is received from common control 160 as described hereinbefore. Similarly, the halt and halt condition bits are employed as described in connection with autonomous scanning by mode control logic 720. The miscellaneous bit may be assigned to any storage purpose or left unused. Since mode control logic 720 changes the address in control register 710 during the transmission of intelligence bits in cross-office channels, the signaling and auxiliary bits S, A and B are actually addressed in the order in which they are listed in table I.

Scan gates 730 also translate the two bit instruction code contained in the instruction section of control register 710. These two instruction bits permit four distinct operations to be performed including "read only," "write only," and "write except in signalling bits." The structure of the intermediate stores permits simultaneous reading and writing, and delays in scan gates 730 make this a "read before write" operation in control register 710. Autonomous scanning, as described for mode control logic 720 is a "read only" operation.

The particular logic circuitry necessary to perform these transfer operations in scan gates 730 is illustrated for those transfers involving receive gates 750. As noted in FIG. 7, this circuitry includes AND, OR and Inhibit gates. The portion of scan gates 730 associated with transmit gates 760 comprise similar logic gates arranged in the same fashion as those illustrated.

Comparison circuit 740 operates in similar fashion to that described for the selectors and for the receive and transmit memories. In this instance, the address contained in the channel section of control register 710 is compared with the channel addresses from the corresponding group clock 180–1. Receive gates 750 and transmit gates 760 are similar to the corresponding gates in the selectors as previously described, including unipolar-to-bipolar conversion for the write gates when such conversion is employed in the transmit gates of the selectors.

SERVICE CIRCUITS

This system arrangement permits some of the network terminals to be allocated for use as service circuits that perform functions other than completing a talking path through the network. Such functions include dial pulsing, multifrequency pulsing, and special tones and announcements. Circuitry for use in this regard is available in the art and forms no part of this invention. When the scanner detects that there is a need for the assignment of a service circuit for any of these purposes, it is a simple matter to connect such a service circuit through a junctor to the trunk requiring its service. In the case of dial pulsing, when the service circuit has received all of the dial pulses, it will convey the stored information to central control 160 for further processing. In those cases in which digital information is received in coded form and is to be connected to outgoing analogue trunks, coders and decoders as known in the art may be employed. Where tone and announcement trunks are employed, one coder channel may supply several service circuits or the equivalent. Several selectors may address the same service trunk channel in different cross-office channels, or even in the same channel if the intermediate store output power will permit.

ESTABLISHMENT OF A CALL CONNECTION

The operation of a network in accordance with this embodiment of the invention may best be understood by considering the establishment of a typical call connection through the network. Such an operation is performed in three distinct parts which may be termed supervisory signalling, dial pulsing to identify the called party, and the actual completion of the connection through the network. Again for ease of understanding, we will select the send path of trunk 100–1 as carrying a request for service in trunk channel 3. Thus in this instance the eighth bit in channel 3 of trunk frame $F_1$ will contain an off-hook indication as the signalling bit. The bit stream will pass through trunk interface 301 and write gates 310 to odd and even work stores 311 and 312. In this instance, of course, since channel 3 is involved, the signaling bit will be passed to odd word store 311.

Counter 350 is advanced automatically so as to store the number 3 in binary form, and when this matches the trunk channel address from group clock 180–1, comparison circuit 360 will provide an output signal through AND gate 342. This output enables AND gate 321 to pass the eight bits stored in the odd word store 311, representing the content of trunk channel 3, through read gates 320 in serial form as determined by the eight sequential outputs of address logic 330. These trunk channel bits thus are passed in serial form through OR gate 322 and enter circulating store 370, each successive bit being inserted in the third bit position of each corresponding intermediate channel of frame $F_3$, FIG. 2C.

In this instance, a signaling frame is involved such that trunk interface 301 provides an output on lead 306 which directs address logic 330 to inhibit transfer of a digit in bit position 8. Instead the ninth bit position S steals or is superimposed upon the eighth bit output of address logic 330 so as to gate the signaling bit through read gates 320 for insertion in intermediate store 370 where it occupies the third bit position in channel S, FIG. 2C.

Each output of intermediate store 370 is returned to its own input via inhibit gate 371 and OR gate 322. Each output is also applied to one input of all of the selectors 130–1 through **130–*t* in trunk group 110–1**.

Figure 7:
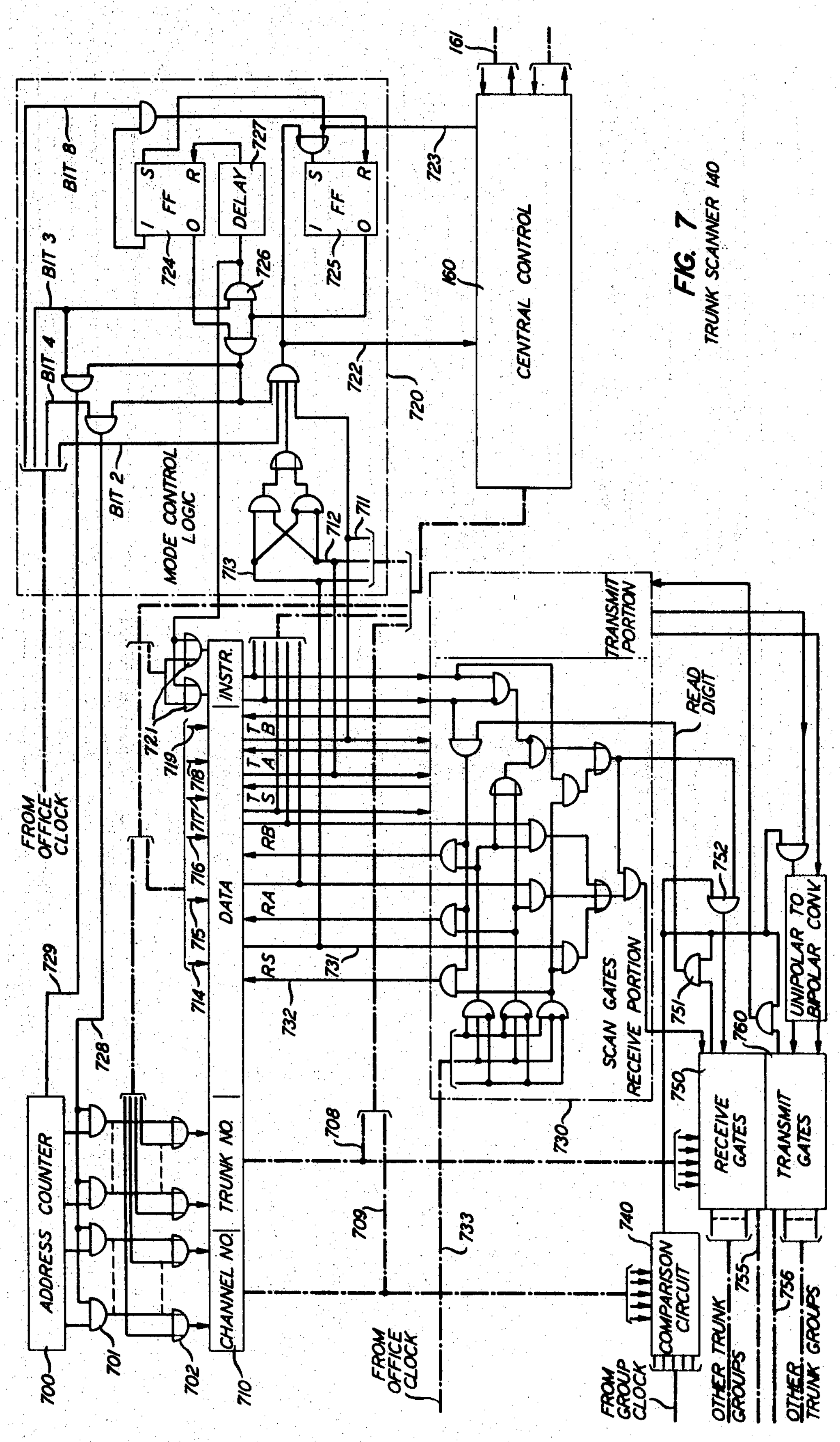

In addition all of the intermediate store 370 outputs are applied to one input of receive gates 750 in trunk scanner 140, FIG. 7. Thus, during an autonomous scan, the trunk number section of control register 710 will provide an output corresponding to the address of trunk 100–1. This output will serve to enable receive gates 750 to pass the bit stream from intermediate store 370 to AND gate 751. The trunk scanner is only concerned with bits in intermediate channels S, A and B of frame $F_3$, FIG. 2C, as contained in intermediate store 370. Although comparison circuit 740 will enable AND gate 751 during each channel of frame $F_3$, office clock 170 will p ovide distinct code designations to scan gates 730 via cable 733 which will permit passage through scan gates 730 of bits found only in channels S, A and B. Thus, at the proper time, the signaling bit which arrives on trunk 100–1 in trunk channel 3 will be inserted in the data section of control register 710 in trunk scanner 140 via lead 732. As noted in Table I hereinbefore, the particular code which permits passage of the signaling bit of scan gate 730 for storage in the data section of control register 710 is 001.

The halt and halt condition bits were previously written in the data section of control register 710 in the transmit channel positions A and B by central control 160 via leads 718 and 719. Mode control logic 720 is arranged to examine the signaling, halt and halt condition bits as received from the data portion of control register 710 via leads 713, 712 and 711, respectively. In this instance the halt bit will be a "1" and the signaling bit will be the same as the halt condition bit, a situation to which mode control logic 720 reacts by sending a signal to central control 160 on lead 722 and thereafter suspending its autonomous scanning operations. Central control 160 now proceeds to read out the channel and trunk numbers from control register 710 via cables 708 and 709 during cross-office channel 2 so as to record the source of the request for service. The signaling bit registered in the data section of control register 710 is also transmitted to central control 160 at this time. Thereafter, in cross-office channel 3, mode control logic 720 resets the instruction section of control register 710 via OR gates 721 to the "read only" instruction. However, it will not advance address counter 700 as would normally occur at this time if the scanner were in the autonomous mode. Thus the scanner again will receive the service request from trunk 100–1 for temporary storage in the data section of control register 710, and central control 160 again will read out control register 710 during the succeeding cross-office channel 2 thereby achieving a verification of the presence of this service request. Mode control logic 720, absent further commands from central control 160 via lead 723, now returns to its autonomous mode of operation, whereupon an advance signal is applied to address counter 700 and the scan of the next trunk is begun.

The dial pulses identifying the called party are now received in the network via trunk 100–1. Central control 160 may recognize this called party designation directly through scanner 140 in the same manner as the request for service indication was recognized, the beginning and end of each dial pulse being considered as a distinct change of state. However, if traffic through the office is substantial, service circuits may be employed to time and count the individual pulses. In this event central control 160 will supply a junctor with the address of trunk 100–1 as well as the address of a special service trunk containing a digit register in order to record the dial pulses received in trunk channel 3 on trunk 100–1.

Figure 5:
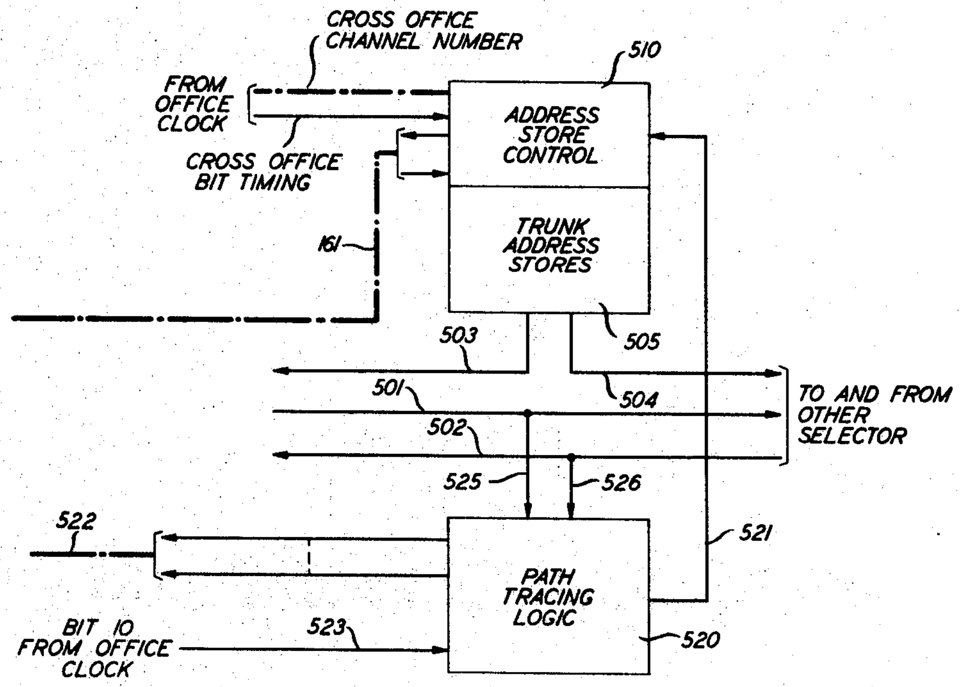

In order to complete the trunk-to-dial pulse register connection through the network, central control 160 provides a cross-office channel designation to address store control circuit 510 in the junctor, FIG. 5. Inspection of the trunk addresses currently appearing in the designated cross-office channel, of trunk address stores 505 by control circuit 510 will verify that the junctor is, in fact, idle in this cross-office channel, as indicated by the presence of a trunk channel designation above 24. Having verified the idle condition of the cross-office channel, control circuit 710 will transfer the address of trunk channel 3 and trunk 100–1, together with the channel and trunk address of the special service trunk containing the dial pulse register, to trunk address stores 505 in the selected cross-office channel. Thereafter, upon each appearance of the selected cross-office channel in the repetitive cross-office frame $F_2$, the address of trunk channel 3 in trunk 100–1 will be transmitted from address stores 505 to address buffer store 420 in selector 130–1 via lead 503. Similarly, the address of the special service trunk selected to receive dial pulses will be transmitted from address stores 505 to the corresponding selector via lead 504.

As described hereinbefore with reference to the operation of the selector, the address is transferred from address buffer store 420 to address register 430 at the end of the current cross-office channel under control of office clock 170. The content of the trunk number portion of address register 430 then serves to enable receive gates 400 to observe the entire content of intermediate store 370 during the next cross-office channel. A match will occur in comparison circuit 440 upon receipt from group clock 180–1 of the designation of trunk channel 3. This, in turn, will enable AND gate 402 to transfer the third bit found in each of the 11 channels in intermediate frame $F_3$ to transfer buffers 410. In this instance, of course, the only bit of interest is that found in the signalling channel S which reflects the dial pulsing. Thus, although all digits received in channel 3 on trunk 100–1 will be transmitted through the junctor from transfer buffers 410 to the receiving special service trunk, only the signaling bit will be registered.

When registration of the called party designation has been completed, central control 160 will arrange for its outpulsing and then reconnect selector 130–1 to the selector which has access to a trunk leading to the called line. This may involve a junctor reassignment which will be executed in the manner described with respect to assignment of a special service trunk. In most instances, of course, the called line will terminate on a remote central office such that this tandem office will be required to outpulse the called party designation from the special service trunk to the destination via an interoffice trunk accessible through a selector.

Hunting for idle trunks and idle service circuits may be accomplished by directed scans, addressing each trunk channel individually to examine its status as recorded in the circulating stores. Also, hunting for an idle cross-office time channel could be accomplished by reading the trunk address stores, such as stores 505 in the junctor of FIG. 5, to determine which cross-office channels contain numbers above 24. This approach may be wasteful of processor time, however, and it would be advantageous to store complete busy-idle information in central control 160. Idle trunk and junctor hunting would then be accomplished without communication between central control 160 and the various circulating stores.

As indicated hereinbefore, certain cross-office channels are forbidden unless the trunks involved are synchronized. In order to assure that forbidden channels are not assigned to a particular call connection, central control 160 must be able to determine the time of receipt of any trunk channel, preferably prior to the occurrence of this event. For this purpose a distinctive instruction from central control 160, containing a trunk group number and a trunk number, directs that the content of counter 350 in the receiver memory, FIG. 3, and the current cross-office channel generated by office clock 170 be returned simultaneously to central control 160. This will serve to advise central control 160 of the exact phase of the trunk signal with respect to the office clock so that forbidden cross-office channels may be computed for any trunk channels.

Actual establishment of the call connection upon answer by the called party, simply involves writing the addresses of the trunks in the trunk address stores of the assigned junctor after having verified that the selected cross-office channel is in fact idle. To reserve a talking path during outpulsing, central control 160 may mark a cross-office channel as busy in the junctor but not allow control circuit 510 to place the trunk addresses in address store 505.

BREAKING A CONNECTION

It is assumed in this instance that the calling line assigned to channel 3 of trunk 100–1 now disconnects. This will change the condition of the signaling bit in channel 3, which change will be detected by trunk scanner 140. Central control 160 is apprised of this condition in a manner similar to the trunk scanner operation upon receipt of a service request. A directed scan instruction then will be sent to the instruction section of control register 710 via OR gates 721. This instruction will permit scan gates 730 to write a "1" in channel A of intermediate store 370 via AND gate 752, receive gates 750, and OR gate 322. It may be noted that the signal from trunk scanner 140 includes a write enable signal, which is transmitted via lead 372 to one input of inhibit gate 731, thus preventing the recirculation via lead 373 of the bit previously stored in channel A in intermediate store 370.

Having entered a binary "1" in intermediate channel A of intermediate store 370, the next read out of receive memory 120–1 by selector 130–1 will result in the transmission of this binary "1" designation in channel A through receive gates 400, AND gate 402 and transfer buffers 410 to the assigned junctor in the assigned cross-office channel. Path-tracing logic 520 receives a signal from office clock 170 on lead 523 at each appearance of cross-office channel bit A, FIG. 2D. Thus, logic 520 will recognize the presence of this "1" in position A of the cross-office channel and immediately will transmit a signal via lead 521 to control circuit 510, which circuit, in turn, will write the cross-office channel number in its channel register.

Upon the next appearance of this cross-office channel in trunk address stores 505, control circuit 510 will alter the two most significant bits in the trunk channel numbers so as to produce trunk channel numbers above 24. Path-tracing logic 520 then will report the particular junctor identity to central control 160 via cable 522. Central control 160 may now revise its records to indicate that the call connection involving this particular junctor has been discontinued. Since the junctor is the only place in which call connection information is stored in the network, no other action is required.

It is to be understood that the above-described arrangements are illustrative of the application of the principles of the invention. Numerous other arrangements may be devised by those skilled in the art without departing from the spirit and scope of the invention.

We claim:

1. A system for switching data received in multiplex digital form comprising means for receiving said data from a source terminal in a first number of channels at a first frequency, means for transmitting said data to a destination terminal in said first number of channels at said first frequency, means for transferring said data from said receiving means to said transmitting means in selected channels greater in number than said first number of channels at a second frequency and means coupled between said transferring means and each of said receiving and transmitting means for circulating said data at a third frequency.

2. A system for switching digital signals multiplexed on trunks in repetitive trunk channels comprising means for receiving incoming pulse trains at a first rate, means for transmitting outgoing pulse trains at said first rate, and means for increasing the number of channels and digit intervals per channel available for transmission of said digital signals through said system comprising means in said receiving and transmitting means for circulating said pulse trains at a second rate, and means for transmitting pulse trains between said receiving means and said transmitting means at a third rate in selected ones of an increased number of channels, said first, second and third transmission rates being distinct from one another.

3. A system in accordance with claim 2 further comprising clock means connected to said receiving and transmitting means for defining a repetitive trunk frame comprising a plurality of trunk channels each defining a time interval containing a first plurality of digits, and wherein said receiving and transmitting means comprises means connected to said circulating means for storing multidigit words received in one of said trunk channels.

4. A system in accordance with claim 3 wherein said storing means comprises even channel storage means for storing multidigit words received in even numbered trunk channels and odd channel storage means for storing multidigit words received in odd-numbered trunk channels, said receiving and transmitting means further comprising gating means between said circulating means and said odd and even channel storage means and means for enabling said gating means to transfer multidigit words between said circulating means and alternate ones of said odd and even channel storage storage means.

5. A system in accordance with claim 4 wherein said clock means further comprises means for defining a repetitive intermediate frame comprising a plurality of intermediate channels each defining a time interval containing a second plurality of digits, said receiving and transmitting means comprising means for storing each digit of one of said multidigit words in said circulating means in a different one of said intermediate channels.

6. A system in accordance with claim 5 wherein said clock means further comprises means for defining a repetitive cross-office frame comprising a plurality of cross-office channels each defining a time interval containing a third plurality of bits, said transferring means comprising means for sorting one digit from each intermediate channel of one intermediate frame in a single cross-office channel.

7. A system in accordance with claim 5 wherein said clock means defines fewer time intervals in said trunk channels than in said intermediate channels for storage of intelligence and signalling digits and wherein said enabling means comprises means for transferring a signaling digit from one digit position in a trunk channel to a signaling digit position in an intermediate channel and means for inserting a dummy digit in the intermediate channel in the digit position corresponding to said one trunk channel digit position.

8. A system in accordance with claim 5 further comprising means for generating control digits and means for inserting said control digits in said circulating means in selected portions of each intermediate channel supplementing said intelligence and signaling digits received from said trunks.

9. A system in accordance with claim 6 further comprising means utilizing said control digit portions in each intermediate and cross-office channel to absorb the delay encountered by intelligence and signaling digits in transit through the system, said delay absorbing means comprising means for shifting each of said intelligence and signaling digits by one digit interval during each transition between said second and third transmission rates while maintaining the same relative digit positions.

10. A digital switching system comprising comprising means for receiving and transmitting information contained in a first time frame comprising a first number of repetitive time channels occurring at a first rate, means in each of said receiving and transmitting means for rearranging said information into a second time frame comprising intermediate time channels and for circulating said rearranged information at a second rate and means for transferring said information from said receiving means to said transmitting means in a third time frame comprising a third number of time channels occurring at a third rate, said third number of time channels being greater than said first number of time channels, and said transferring means comprising means for selectively accessing said circulating means for selectively accessed information from said accessing means to selected time channels of said third frame.

11. A digital switching system in accordance with claim 10 wherein said receiving means comprises means for applying digital information received in repetitive trunk channels to said circulating means, each individual digit received in a trunk channel being stored in a different intermediate channel in said circulating means.

12. A tandem office comprising a combination time and space division system for switching signals contained in repetitive time channels multiplexed in a serial bit stream on an incoming trunk to selected outgoing trunks, said system comprising means for storing said incoming bit stream under control of timing information derived from said bit stream, office timing means generating control signals at first, second and third frequencies, means for interleaving and circulating said bit stream at said second frequency, means connected to said circulating means for remultiplexing and transmitting said bit stream through said switching system at said third frequency, means for removing and storing the circulating bit stream and means for transmitting the sorted information to the selected outgoing trunks at said first frequency.

13. A system for switching time division multiplexed information in digital form between incoming and outgoing trunks transmitting multibit words in repetitive trunk channels comprising first and second means for circulating information at a rate faster than the trunk transmission rate, means for rearranging and transferring information from incoming trunk channels to intermediate channels in said first circulating means, said intermediate channels having a greater bit capacity than said trunk channels, means for selectively retrieving one bit of said rearranged information in each cycle of said first circulating means, means for transmitting the retrieved information between said first and second circulating means in selected cross-office channels having a bit capacity greater than said trunk channels and less than said intermediate channels, the number of cross-office channels being greater than the number of trunk channels, and means for rearranging and transmitting the content of said second circulating means over said outgoing trunk.

14. A digital switching system comprising a plurality of trunk groups each comprising a plurality of memories receiving information at a first rate as multibit words in repetitive channels from the trunks terminating on the corresponding trunk group, a plurality of memories for transmitting said information to said trunks at said first rate, an intermediate store in each of said receiving and transmitting memories for circulating said information at a second rate and a plurality of selectors each having access to all of said intermediate stores in the corresponding trunk group, a junctor network for transferring said information between said intermediate stores via said selectors, control means for applying trunk and channel identities to said selectors through said junctor network and means for individually connecting said selectors simultaneously to an intermediate store in a memory for receiving information and to an intermediate store in a memory for transmitting information, each of said selectors comprising means for registering said trunk and channel identities and means enabled by said registering means for transferring said information from a selected one of said receiving memories to said junctor network and for transferring said information from said junctor network to a selected one of said transmitting memories at a third rate.